(12) United States Patent
Saito et al.

(10) Patent No.: US 8,435,664 B2
(45) Date of Patent: May 7, 2013

(54) BATTERY SYSTEM HAVING TEMPERATURE EQUALIZING WALLS IN DUCTS

(75) Inventors: Masao Saito, Kasai (JP); Kazunobu Yokotani, Hirakata (JP); Shinsuke Nakamura, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 315 days.

(21) Appl. No.: 12/772,412

(22) Filed: May 3, 2010

(65) Prior Publication Data
US 2010/0285347 A1 Nov. 11, 2010

(30) Foreign Application Priority Data
May 8, 2009 (JP) .................................. 2009-114011

(51) Int. Cl.
*H01M 10/50* (2006.01)
(52) U.S. Cl.
USPC ................ 429/120; 429/71; 429/72; 429/83; 429/149; 429/152
(58) Field of Classification Search ............ 429/71, 429/72, 83, 120, 149, 152
See application file for complete search history.

(56) References Cited

U.S. PATENT DOCUMENTS
2007/0026301 A1* 2/2007 Lee et al. ........................ 429/120
2009/0111010 A1* 4/2009 Okada et al. ................... 429/120

FOREIGN PATENT DOCUMENTS
| JP | 8-32129 | | 2/1996 |
| JP | 2001-23702 | | 1/2001 |
| JP | 2001319697 A | * | 11/2001 |
| JP | 2005183343 A | * | 7/2005 |

* cited by examiner

*Primary Examiner* — Zachary Best
(74) *Attorney, Agent, or Firm* — Wenderoth, Lind & Ponack, L.L.P.

(57) ABSTRACT

A battery system including battery blocks (3) having a plurality of battery cells (1) stacked with cooling gaps (4) established between the battery cells to pass cooling gas; ventilating ducts (5), which are supply ducts (6) and exhaust ducts (7), disposed on both sides of the battery blocks to forcibly ventilate the cooling gaps; and ventilating apparatus (9) to force cooling gas to flow through the ventilating ducts. Cooling gas forcibly introduced by the ventilating apparatus flows from the supply ducts through the cooling gaps and into the exhaust ducts to cool the battery cells. In addition, the battery system has temperature equalizing walls (8) disposed in the supply ducts. The temperature equalizing walls are long and narrow with length in the direction of flow greater than the width, and each temperature equalizing wall gradually narrows towards the upstream end.

19 Claims, 17 Drawing Sheets

BATTERY SYSTEM HAVING TEMPERATURE EQUALIZING WALLS IN DUCTS

BACKGROUND OF THE INVENTION

1. Field of the Invention

The present invention relates to a battery system having a plurality of battery cells, which are rectangular batteries, joined in a horizontal stack and cooled by forced ventilation via ducts between the battery cells.

2. Description of the Related Art

Battery systems having a plurality of stacked rectangular batteries have been developed (refer to Japanese Laid-Open Patent Publications 2001-23702 and H8-32129 (1996)).

In the battery system disclosed in JP 2001-23702 A, a battery block is formed by stacking many rectangular batteries with intervening spacers to establish cooling gaps. A cooling medium such as air is passed through the cooling gaps established by the spacers. In this battery system, the many stacked rectangular batteries are cooled by the flow of cooling medium such as air through the cooling gaps. In the battery system disclosed in JP H8-32129 A, a battery block is formed by stacking rectangular batteries with intervening heat dissipating plates. In this battery system, the many stacked rectangular batteries are cooled via the heat dissipating plates.

SUMMARY OF THE INVENTION

The battery systems disclosed in the publications described above have the drawback that when the number of stacked rectangular batteries increases, it becomes difficult to maintain a uniform temperature over all the batteries. Specifically, when the number of stacked rectangular batteries increases, it becomes difficult to cool the batteries while reducing the temperature difference between batteries. It is important to reduce the temperature differences as much as possible between the batteries in a battery system with many rectangular batteries stacked together. This is because temperature differences result in non-uniform remaining battery capacity, which leads to reduced battery lifetime. Charging and discharging efficiency is a function of battery temperature. If there are temperature differences, remaining battery capacity differences develop even when each battery is charged and discharged with the same current. If remaining capacity differences develop, batteries with a high remaining capacity are easily over-charged and batteries with low remaining capacity are easily over-discharged. This is a cause of reduced overall battery system lifetime. In a typical battery system, the amount of battery charging and discharging current is controlled by a microcomputer to avoid over-charging and over-discharging. In a battery system that has batteries with different remaining capacities, the microcomputer controls the amount of discharging to make high remaining capacity batteries conform to the amount of discharging set for the low remaining capacity batteries. Conversely, the microcomputer controls the amount of charging to make low remaining capacity batteries conform to the amount of charging set for the high remaining capacity batteries. As a result, if there are high temperature differences and remaining capacity differences between batteries, the amount of power that can be transferred during battery charging and discharging is limited compared to a battery system with low temperature differences. This is the cause of inability to sufficiently extract battery performance, and is the cause of battery system performance degradation.

Further, battery temperature is a parameter that can determine battery lifetime. When the temperature at which battery performance can be sufficiently extracted is used as the reference temperature, the more the battery temperature exceeds the reference temperature the more rapid the rate of battery degradation. As a result of operation such as driving the electric vehicle, batteries stacked together in the battery system generate heat, and system lifetime is approached by degradation from a specific battery. This is because the battery that becomes high in temperature is known to some degree based on battery location and the local cooling environment. Specifically, the probability is high that the first battery in the battery system to reach its lifetime is the battery that continuously rises to a high temperature. A battery system with batteries connected in series fails to perform as a system when even one battery becomes unusable. Consequently, the importance of lowering the temperature of the battery that becomes hottest to delay battery degradation and extend lifetime cannot be overstated. In addition, if there are large temperature differences between batteries, variation develops in the rate of degradation of the batteries stacked in the battery system, and each battery reaches its lifetime at a different time. As a result, the battery system becomes non-functional while containing batteries that have not reached their lifetime and have not been utilized to the full extent of their performance capability. Consequently, lowering the temperature of rapidly degrading batteries and reducing temperature differences between batteries is critical for extending battery system lifetime.

This type of battery system has many batteries stacked together for use in applications that charge and discharge with high currents such as in a hybrid car. Therefore, since manufacturing cost is extremely high, it is important to extend battery system lifetime as much as possible. Specifically, since battery system cost increases with the number of batteries used, longer lifetime is demanded for systems with a large number of batteries. However, a characteristic of these battery systems is that the more batteries that are stacked together, the greater the temperature differences, and the shorter the lifetime.

The present invention was developed with the object of correcting the drawbacks described above for prior art battery systems with stacked rectangular batteries. Thus, it is an important object of the present invention to provide a battery system that can reduce battery cell temperature differences and lower the temperature of the battery cell that becomes hottest to extend system lifetime while maintaining an extremely simple structure.

The battery system of the present invention is provided with battery blocks 3 having a plurality of battery cells 1, which are rectangular batteries, stacked with cooling gaps 4 established between the battery cells 1 to pass cooling gas; ventilating ducts 5, 55, 75 disposed on both sides of the battery blocks 3 that include supply ducts 6, 56, 76 to forcibly introduce cooling gas into the cooling gaps 4 and exhaust ducts 7, 57, 77; and ventilating apparatus 9 to force cooling gas to flow through the ventilating ducts 5, 55, 75. Cooling gas forcibly introduced by the ventilating apparatus 9 flows from the supply ducts 6, 56, 76 through the cooling gaps 4 and into the exhaust ducts 7, 57, 77 to cool the battery cells 1. In addition, the battery system has long narrow temperature equalizing walls 8, 58, 78 with length in the direction of flow greater than the width, and each temperature equalizing wall 8, 58, 78 gradually narrows towards the upstream end.

The battery system described above has the characteristic that battery cell temperature differences can be reduced and lifetime extended while maintaining an extremely simple structure. This is because battery cell temperature differences can be reduced by providing temperature equalizing walls having a simple configuration. For example, when two battery blocks with eighteen lithium ion rectangular battery cells in each block are disposed side by side with a supply duct established in between, and the battery cells are cooled by forcibly passing cooling gas from the supply duct through cooling gaps between the battery cells, the minimum temperature of a battery cell is 23° C., the maximum temperature of a battery cell is 33° C., and the temperature difference is 10° C. In contrast, when the battery system of the present invention with temperature equalizing walls disposed in the supply duct is cooled by otherwise the same ventilating system described above, the minimum temperature of a battery cell is 23° C., the maximum temperature of a battery cell is 28° C., and the temperature difference is reduced to 5° C. Consequently, the present invention can halve the battery cell temperature difference from 10° C. to 5° C. by disposing temperature equalizing walls in the supply duct of a battery system otherwise having the same battery block structure and disposition. If the temperature difference between battery cells is reduced, remaining capacity becomes more uniform over all the battery cells, and the variation in charging and discharging efficiency is reduced. By equalizing the remaining capacity of each battery cell, microcomputer limitations on the amount of charging and discharging relax, and the amount of power transferred during charging and discharging increases compared to when there is remaining capacity variation between battery cells. Accordingly, the capability of each battery cell can be sufficiently exercised, and as a result, system performance can be adequately realized. Further, by reducing the temperature difference between battery cells stacked in the battery system, variation in charging and discharging efficiency is reduced to essentially equalize the degradation rate of all the battery cells. Consequently, since all battery cells reach their lifetime at essentially the same time, the capabilities of all the battery cells have been sufficiently utilized when the battery system reaches the end of its lifetime.

The battery system of the present invention can have temperature equalizing walls 8, 58, 78 disposed in symmetric positions at the top and bottom of a supply duct 6, 56, 76. By disposing temperature equalizing walls at the top and bottom of each supply duct, this battery system has the characteristic that temperature difference between battery cells can be reduced while reducing local temperature differences within each individual battery cell.

In the battery system of the present invention, each temperature equalizing wall 8, 58, 78 can gradually narrow 76 towards the downstream end. Since each temperature equalizing wall gradually narrows at both the upstream and the downstream ends, this battery system can prevent the generation of turbulence in the flow of cooling gas over the temperature equalizing walls. Consequently, this battery system has the characteristic that pressure losses can be reduced in the supply duct cooling gas flow.

In the battery system of the present invention, each temperature equalizing wall 8, 58, 78 can have an inclined slope to narrow the vertical width of the wall towards the upstream end. In this battery system, cooling gas can flow smoothly on the upstream side of the temperature equalizing walls to prevent the generation of turbulence. Consequently, the battery cells can be efficiently cooled while reducing pressure losses in the cooling gas flow.

In the battery system of the present invention, each temperature equalizing wall 8, 58, 78 can have an inclined slope to narrow the vertical width of the wall towards the downstream end. In this battery system, cooling gas can flow smoothly on the downstream side of the temperature equalizing walls to prevent the generation of turbulence. Consequently, the battery cells can be efficiently cooled while reducing pressure losses in the cooling gas flow.

In the battery system of the present invention, the lateral width of each temperature equalizing wall 8, 58, 78 can become narrower towards the peak edge. In this battery system, since the peak edge of each temperature equalizing wall can be disposed next to the battery cells that rise to the highest temperature, the temperature rise in those battery cells can be reduced and the temperature difference between battery cells can be reduced.

In the battery system of the present invention, a battery block 3 can be provided with a pair of endplates 10 disposed at the ends of the battery cell 1 stack, and fastening components 11 that connect the pair of endplates 10. The fastening components 11 can be connecting bands 11X having a prescribed width, and these connecting bands 11X can be disposed at the top and bottom of both sides of the battery cells 1. Openings 14 to the cooling gaps 4 on both sides of the battery cells 1 are locally blocked by these connecting band 11X fastening components 11. The cooling gap 4 openings 14 can be divided into blocked regions 14A at the top and bottom of the battery cells 1 and exposed regions 14B between the blocked regions 14A where the cooling gaps 4 connect with the ventilating ducts 5, 55, 75. The temperature equalizing walls 8, 58, 78 can be disposed in a supply duct 6, 56, 76 outside the blocked regions 14A and the exposed region 14B.

Since the temperature equalizing walls are disposed at blocked regions and at an exposed region, temperature equalizing walls disposed at the blocked regions allow cooling gas forcibly introduced into the supply duct to be effectively used to cool the battery cells and efficiently cool the high temperature battery cells. This is because cooling gas forcibly introduced into the supply duct efficiently flows into the cooling gaps in the exposed region to cool the battery cells due to the temperature equalizing walls disposed at the blocked regions.

In the battery system of the present invention, each temperature equalizing wall 8, 58, 78 is provided with a wide region 8B, 58B, 78B disposed next to a connecting band 11X, and a tapered region 8A, 58A, 78A. The tapered region 8A, 58A, 78A is disposed outside the exposed region 14B and is tapered to widen the distance between the temperature equalizing wall 8, 58, 78 and the sides of the battery cells 1 as the peak edge of the temperature equalizing wall 8, 58, 78 is approached.

By disposing the temperature equalizing wall tapered region near the battery cells that become high in temperature, the high temperature battery cells of this battery system can be efficiently cooled. This is because the tapered region causes the cooling gas to increase in flow rate next to the high temperature battery cells and increase the effective amount of cooling gas ventilation in the cooling gaps. As a result, the battery system battery cells that become the hottest can be lowered in temperature, the rate of battery cell degradation can be reduced, and battery performance capability can be adequately extracted. Further, by lowering the temperature and extending the lifetime of the battery with the highest probability of reaching its lifetime first, other batteries can be used to their maximum capability, and the lifetime of the system can be extended. Specifically, battery system lifetime is extended because degradation of one specific battery does not cause the battery system to become nonfunctional.

In the battery system of the present invention, the battery blocks 3 can be disposed in two rows, supply ducts 6 can be established between adjacent battery blocks 3, and temperature equalizing walls 8 can be disposed symmetrically at the top and bottom of each supply duct 6, along the top of each supply duct 6, or along the bottom of each supply duct 6. By disposing temperature equalizing walls in the supply ducts between two rows of battery blocks, temperature differences between battery cells that make up each battery block on both sides of the supply ducts can be reduced.

In the battery system of the present invention, the battery blocks 3 can be disposed in two rows, supply ducts 6 can be established between adjacent battery blocks 3, and temperature equalizing walls 8 can be disposed symmetrically at the top and bottom of each supply duct 6. The wide regions 8B of the temperature equalizing walls 8 can be disposed between the connecting bands 11X of the battery blocks 3 in the two adjacent rows, and the tapered regions 8A can be disposed between the exposed regions 14B. This battery system has the characteristic that cooling gas forcibly introduced into the supply duct can efficiently cool two rows of battery blocks to reduce temperature differences between the battery cells that make up those battery blocks.

In the battery system of the present invention, the wide regions 8B of the temperature equalizing walls 8, which are disposed in symmetric positions at the top and bottom of the supply ducts 6, can be located between the connecting bands 11X of the battery blocks 3 in two adjacent rows, the tapered regions 8A can be disposed between the exposed regions 14B, and the opposing peak regions can gradually become narrower towards the peak edges. By disposing the tapered regions near the high temperature battery cells of battery blocks in two rows, the high temperature battery cells can be efficiently cooled to reduce temperature differences.

The above and further objects of the present invention as well as the features thereof will become more apparent from the following detailed description to be made in conjunction with the accompanying drawings.

DETAILED DESCRIPTION OF THE PREFERRED EMBODIMENT(S)

The following describes embodiments of the present invention based on the figures. However, the following embodiments are merely specific examples of battery systems representative of the technology associated with the present invention, and the battery system of the present invention is not limited to the embodiments described below.

FIGS. 1-9 show the battery system for the first embodiment, FIGS. 10-13 show the battery system for the second embodiment, and FIGS. 14-17 show the battery system for the third embodiment of the present invention. The battery systems described in these embodiments are primarily suitable for use as power sources in electric powered vehicles such as in a hybrid car, which is powered by both an engine and an electric motor, and in an electric automobile, which is powered by an electric motor only. However, the present invention can also be used in automotive applications other than a hybrid car or an electric automobile and in non-automotive applications where high output is a requirement.

Figure 9:
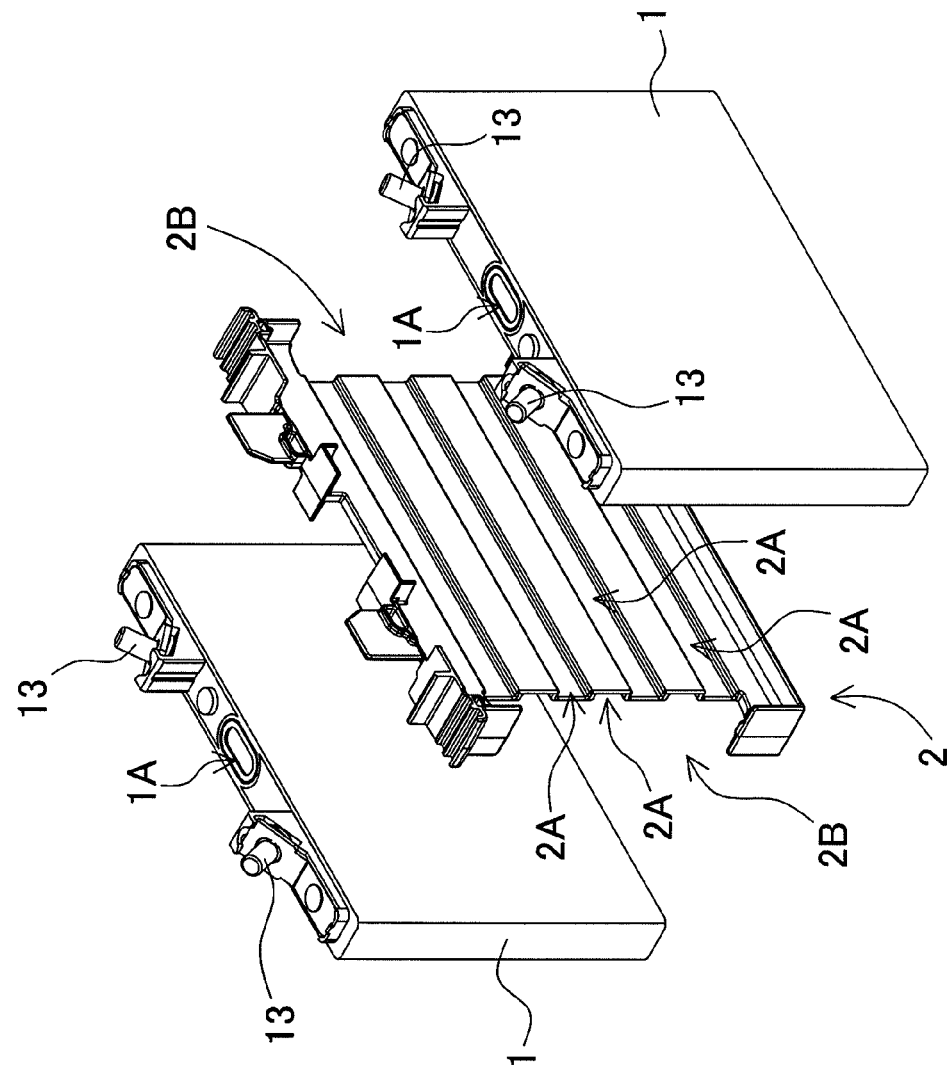
FIG. 9 is an exploded perspective view showing the stacking configuration for battery cells and spacers.
Figure 10:
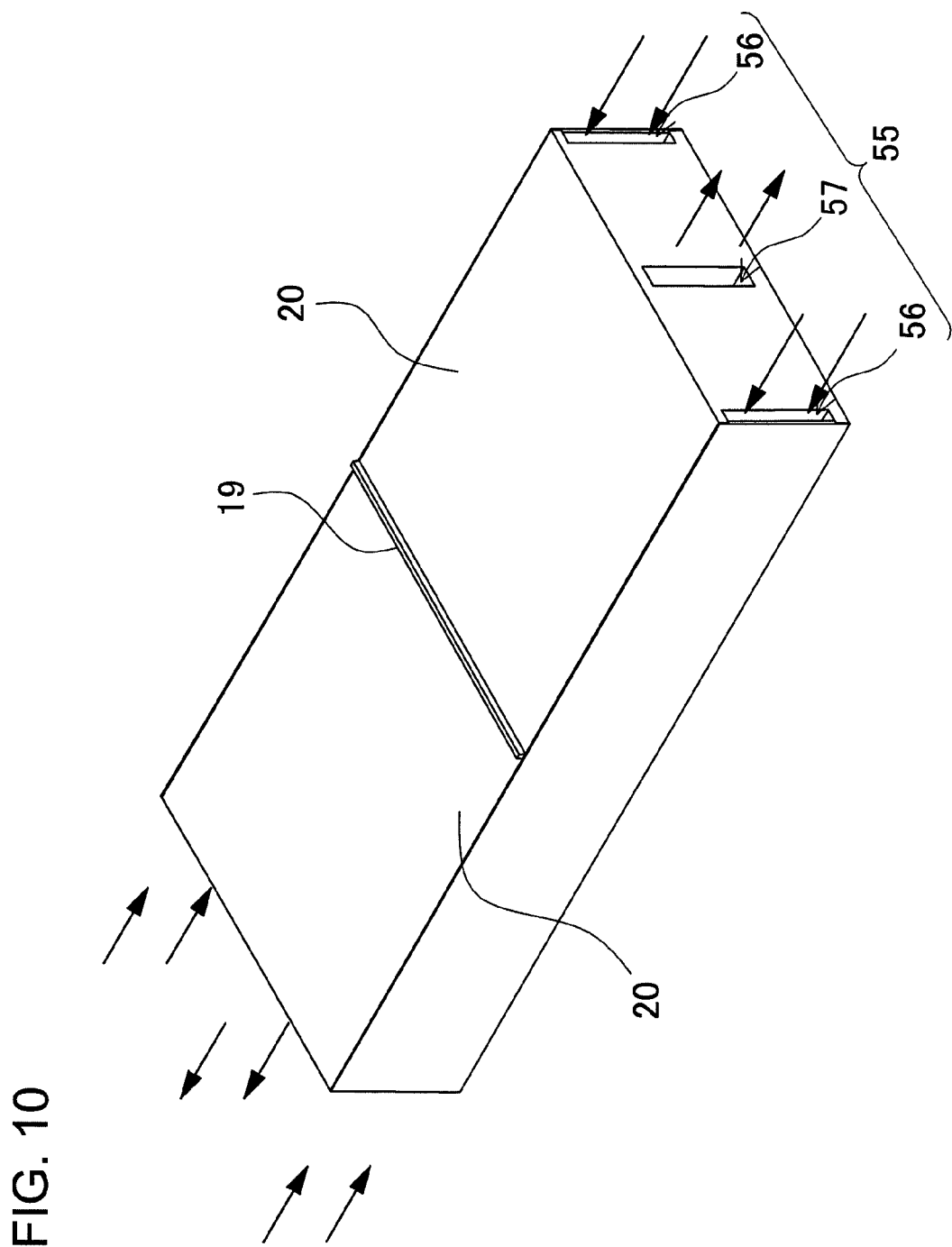
FIG. 10 is a diagrammatic perspective view of a battery system for another embodiment of the present invention.

In the following embodiments, the battery system is provided with battery blocks 3 having a plurality of battery cells 1, which are rectangular batteries, stacked together with cooling gaps 4 established between the battery cells 1, and ventilating apparatus 9 that cool the battery cells 1 of the battery blocks 3 by forced ventilation with cooling gas. A battery block 3 has spacers 2 sandwiched between the stacked battery cells 1. As shown in FIG. 9, a spacer 2 is shaped so as to form cooling gaps 4 between the battery cells 1. In addition, the spacer 2 is configured to accept battery cells 1 that fit into both sides. Battery cells 1 are stacked together with adjacent battery cells 1 fit into intervening spacers 2 to prevent position shift.

The rectangular battery cells 1 are lithium ion rechargeable batteries. However, rechargeable batteries such as nickel hydride batteries and nickel cadmium batteries can also be used as the battery cells. A battery cell 1, as shown in the figures, has a rectangular shape of given thickness, has positive and negative electrode terminals 13 protruding from the ends of the top surface, and has a safety valve opening 1A established at the center region of the top surface. Adjacent electrode terminals 13 of the stacked battery cells 1 are connected via connecting hardware (not illustrated) to connect the batteries in series. Positive and negative electrode terminals 13 of adjacent stacked battery cells 1 are connected together for series connection. Bus-bars (not illustrated) can be used to join the positive and negative electrode terminals 13 and connect the battery cells 1 in series. A battery system with adjacent battery cells 1 connected in series can establish a high voltage for high output. However, the battery system can also have adjacent battery cells connected in parallel. A battery cell 1 is made with a metal external case. To prevent short circuits between adjacent battery cells 1, insulating spacers 2 intervene between the battery cells 1. A battery cell can also be made with an external case that is an insulating material such as plastic. In that case, there is no need to insulate the external cases of stacked battery cells, and the spacers can be made from metal.

Figure 6:
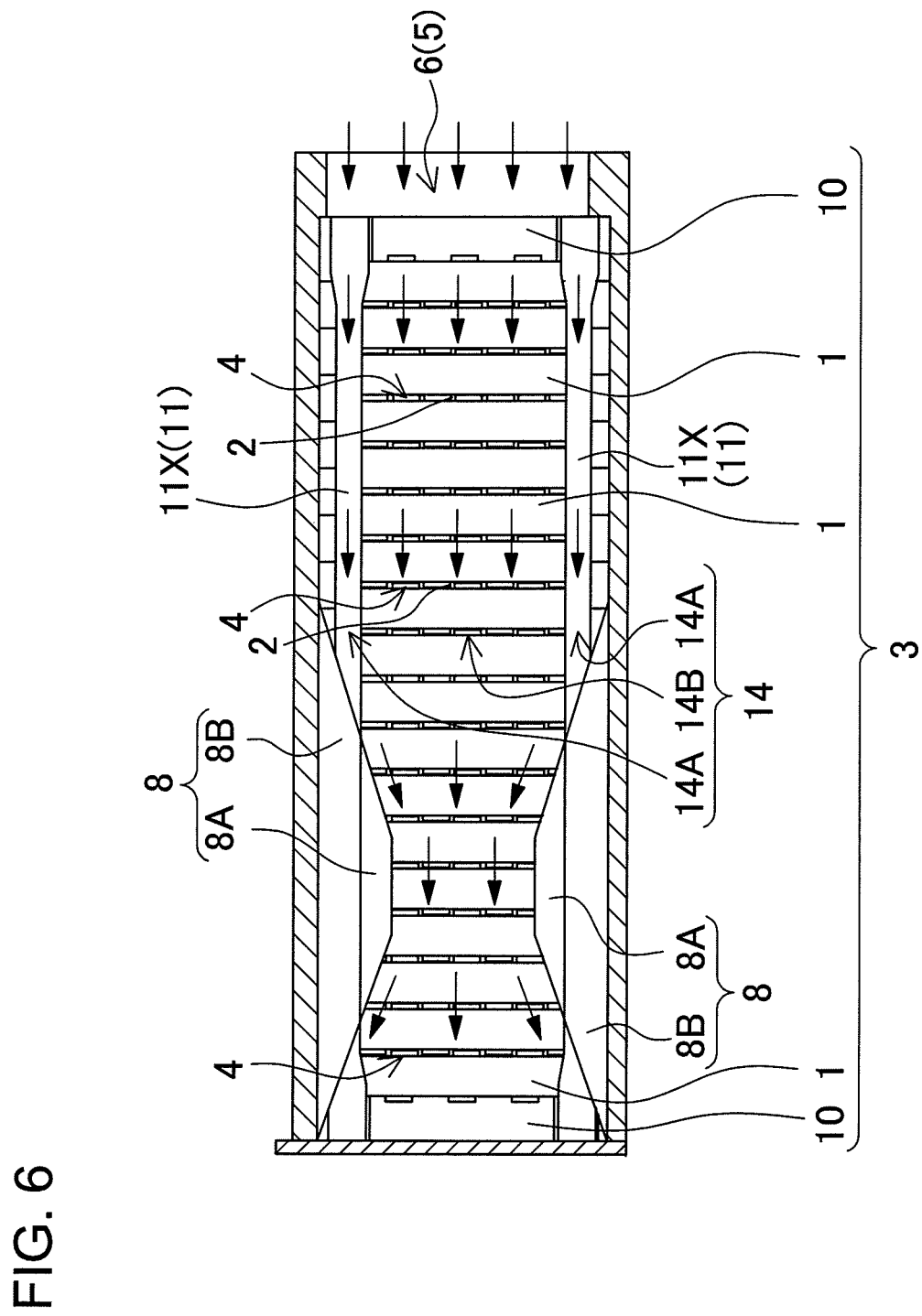
FIG. 6 is a cross-section through the line VI-VI of the battery system shown in FIG. 4.

A spacer 2 is made from an insulating material such as plastic to insulate adjacent battery cells 1. As shown in FIG. 6, spacers 2 are provided with cooling gaps 4 between each battery cell 1 and spacer 2 to pass a cooling gas such as air to cool the battery cells 1. The spacer 2 shown in FIG. 9 is provided with grooves 2A between the spacer 2 and opposing battery cell 1 surfaces that extend to both side edges and establish cooling gaps 4 between the spacer 2 and battery cells 1. The spacer 2 of the figure is provided with a plurality of parallel grooves spaced at set intervals. The spacer 2 of FIG. 9 has grooves 2A on both sides, and cooling gaps 4 are established between the spacer 2 and adjacent battery cells 1. This configuration has the characteristic that battery cells 1 on both sides of the spacer 2 can be effectively cooled by the cooling gaps on both sides of the spacer 2. However, grooves can also be provided on only one side of the spacer to establish cooling gaps between the spacers and battery cells. The cooling gaps 4 of the figures are established in a horizontal direction to open on both sides of a battery block 3. Further, the spacer 2 of FIG. 9 is provided with cut-out regions 2B on both sides. Here, the gap between adjacent battery cell 1 surfaces is widened at the cut-out regions 2B on both sides allowing cooling gas flow resistance to be reduced. As a result, cooling gas flows smoothly from the cut-out regions 2B to the cooling gaps 4 between the spacer 2 and battery cell 1 surface for effective battery cell 1 cooling. In this manner, forced ventilation of cooling gas through the cooling gaps 4 directly and efficiently cools the battery cell 1 external cases. This structure has the characteristic that battery cells 1 can be efficiently cooled to effectively prevent battery cell 1 thermal runaway.

Figure 8:
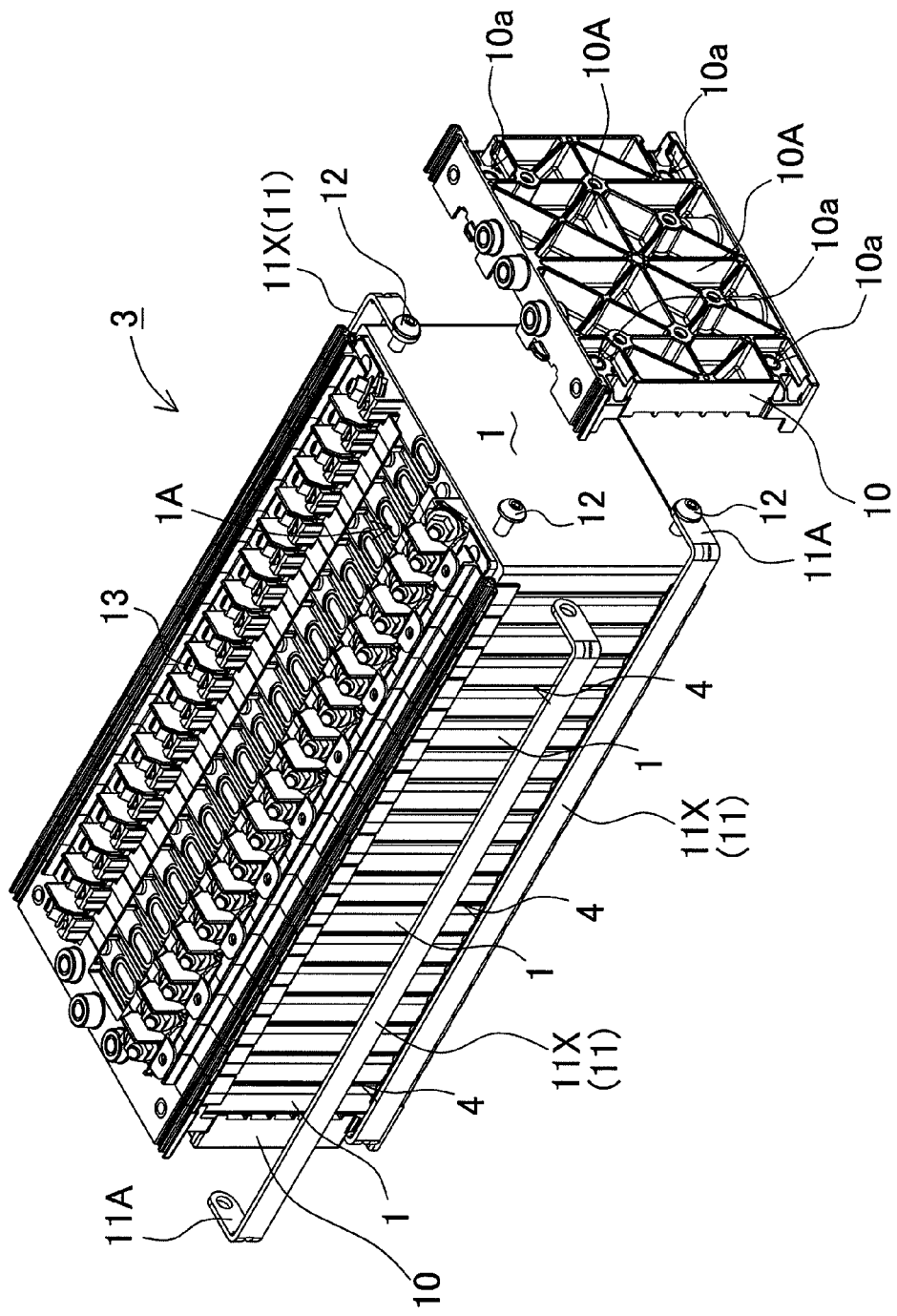
FIG. 8 is an exploded perspective view of a battery block of the battery system shown in FIG. 2.

A battery block 3 is provided with endplates 10 disposed at the ends of the battery cell 1 stack, and the pair of endplates 10 is connected by fastening components 11 to solidly hold the stack of battery cells 1 and spacers 2 between the endplates 10. The endplates 10 have essentially the same rectangular outline shape as the battery cells 1. As shown in FIG. 8, the fastening components 11 have bent regions 11A that bend inward at both ends and attach to the endplates 10 via set screws 12. Although not illustrated, the fastening components can also be attached to the left and right sides of the endplates via set screws. In that case, screw-holes can be provided in the sides of the endplates, and set screws can be passed through the fastening components and screwed into the sides of the endplates. Fastening components attached to the sides of the endplates do not need bent regions and can be attached to the endplates in a straight-line.

Each endplate 10 of FIG. 8 is formed from plastic or metal as a single unit with reinforcing ribs 10A on the outside. Further, each endplate 10 is provided with connecting holes 10a in the outside surface to attach the bent regions 11A of the fastening components 11. Each endplate 10 of FIG. 8 has four connecting holes 10a in the four corners of the outside surface. The connecting holes 10a are female screw-holes. Set screws 12 can be passed through the fastening components 11 and screwed into the connecting holes 10a to attach the fastening components 11 to the endplates 10.

The fastening components 11 are connecting bands 11X having a set vertical width. The connecting band 11X fastening components 11 are sheet metal straps with a set width. Connecting band 11X fastening components 11 attached at both ends to the four corners of each endplate 10 are disposed at the top and bottom of both sides of the battery cells 1. A battery block 3 with connecting bands 11X disposed at the top and bottom of both sides has part of the cooling gaps 4 between battery cells 1 blocked by the connecting bands 11X. Specifically, cooling gas cannot enter the openings 14 of the cooling gaps 4 blocked by the connecting bands 11X. As a result, the openings 14 of the cooling gaps 4 on both sides of the battery cells 1 can be divided into blocked regions 14A, which are blocked at the top and bottom by the connecting bands 11X, and exposed regions 14B, which are not blocked by the connecting bands 11X. The exposed regions 14B are between the upper and lower blocked regions 14A, and connect with the ventilating ducts 5. Exposed regions 14B connect with a supply duct 6 and cooling gas is forcibly introduced into the exposed region 14B cooling gaps 4 from the supply duct 6. Since connecting band 11X fastening components 11 are disposed at the top and bottom of both sides of a battery block 3, the cooling gaps 4 on both sides of the battery block 3 are divided into those in the blocked regions 14A at the top and bottom connecting bands 11X and those in the exposed regions 14B. Exposed regions 14B on one side of the battery block 3 connect with a supply duct 6, exposed regions 14B on the other side connect with an exhaust duct 7, and the battery cells 1 are cooled by forced ventilation of cooling gas through the cooling gaps 4 of those exposed regions 14B.

As shown in FIGS. 2, 4, 5, and 7, the battery blocks 3 are arranged in two separated rows, and ventilating ducts 5 are established between the two rows and on the outer sides. The battery system of the figures is provided with supply ducts 6 between the two rows of battery blocks 3 and connecting with each cooling gap 4. Further, exhaust ducts 7 are provided on the outer sides of the two separated rows of battery blocks 3, and a plurality of parallel cooling gaps 4 connect the exhaust ducts 7 with the supply ducts 6. As shown by the arrows in FIGS. 1 and 4, cooling gas is forced to flow from the supply ducts 6 to the exhaust ducts 7 by the ventilating apparatus 9 to cool the battery cells 1 of this battery system. Cooling gas flow from the supply ducts 6 to the exhaust ducts 7 splits at the supply ducts 6 to flow through each cooling gap 4 to cool the battery cells 1. Cooling gas that has passed through a cooling gap 4 to cool a battery cell 1 is collected in the exhaust ducts 7 and discharged from the system.

The battery system of FIGS. 1-9 is provided with supply ducts 6 between the two rows of battery blocks 3 and exhaust ducts 7 on the outer sides. However, the battery system of the present invention can also be provided with the supply ducts and exhaust ducts in reversed positions. The battery system shown in FIGS. 10-13 is provided with supply ducts 56 on the outer sides of the two rows of battery blocks 3, and exhaust ducts 57 between the two rows of battery blocks 3. As shown by the arrows in FIGS. 10 and 11, the battery cells 1 of this battery system are cooled by cooling gas forced to flow from the supply ducts 56 at the outer sides through the cooling gaps 4 to the exhaust ducts 57 at the center by the ventilating apparatus 9. Cooling gas forcibly introduced from the outer supply ducts 56 flows through each cooling gap 4 to cool the battery cells 1. Cooling gas that has passed through the cooling gaps 4 to cool the battery cells 1 is collected in the central exhaust ducts 57 and discharged from the system.

Figure 4:
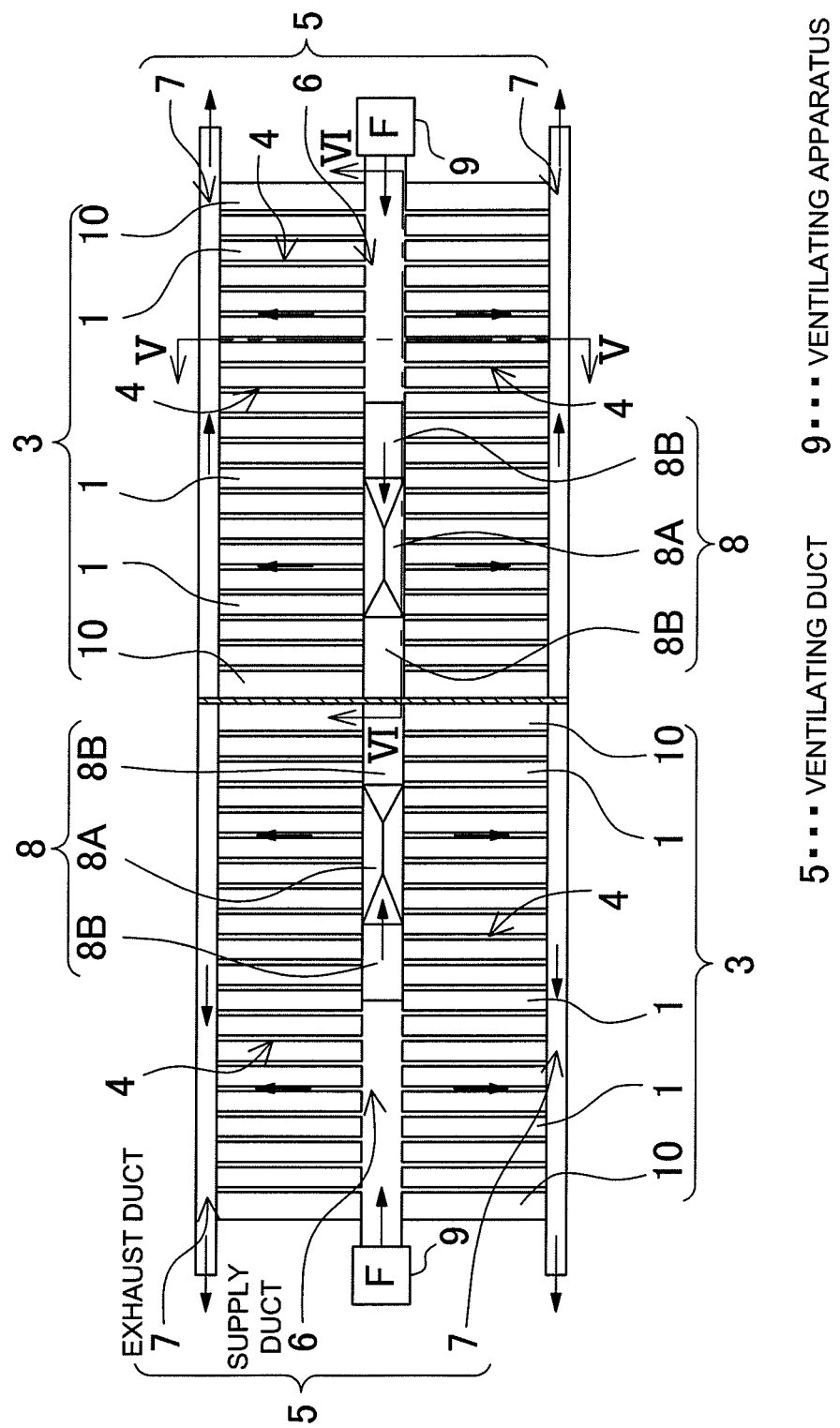
FIG. 4 is a diagrammatic horizontal cross-sectional view of the battery system shown in FIG. 3.
Figure 11:
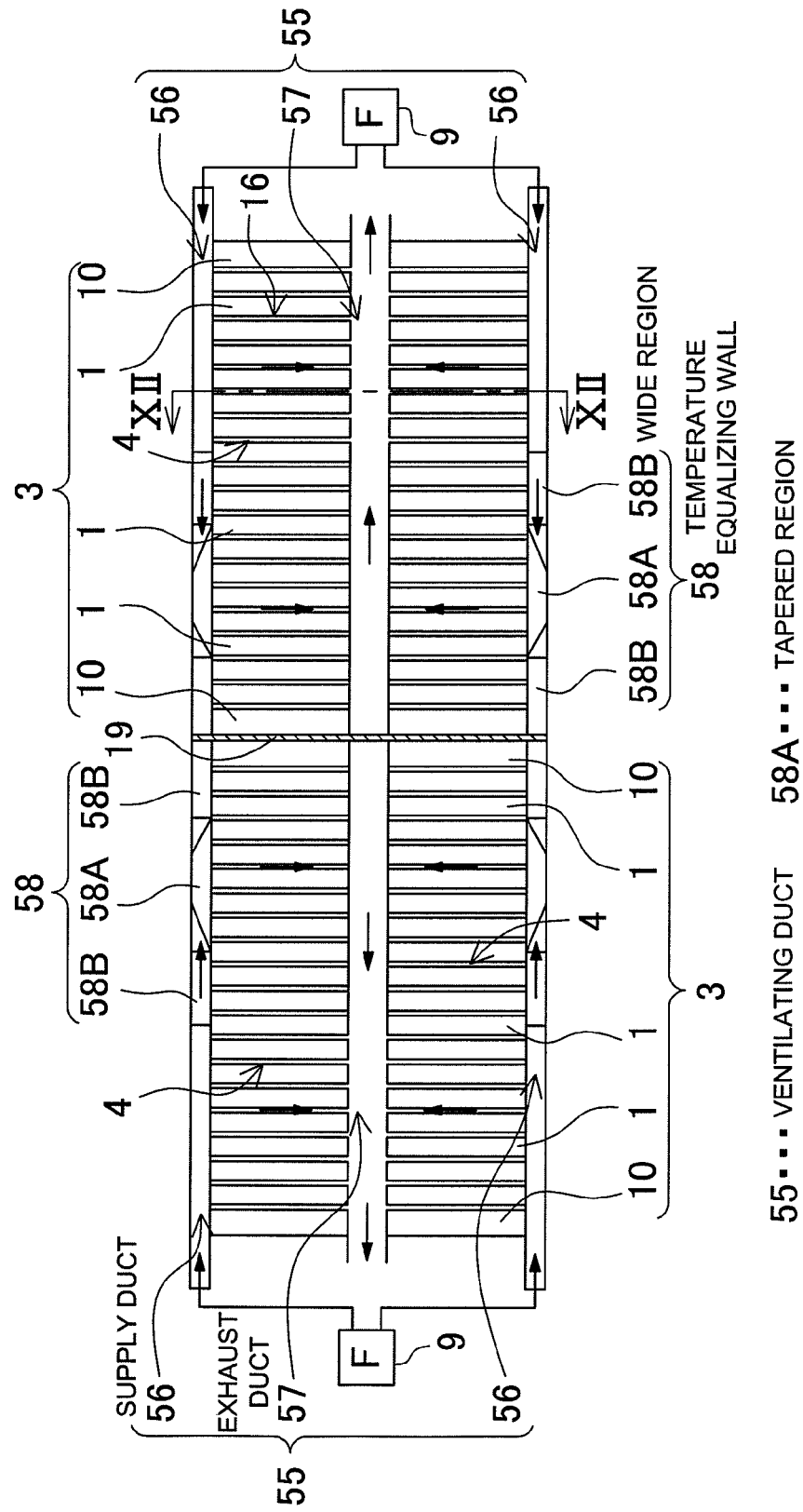
FIG. 11 is a diagrammatic horizontal cross-sectional view of the battery system shown in FIG. 10.

The battery systems of FIGS. 1-5 and FIGS. 10-13 are made up of four battery blocks 3 arranged in two rows and two columns. The two battery blocks 3 in each column are oriented in parallel and ventilating ducts 5, 55 are established at the center and outer sides of those battery blocks 3. Further, the battery systems of the figures have two columns of two battery blocks 3 that are disposed in a separated manner. Specifically, a center blocking wall 19 is disposed between the two adjacent columns of battery blocks 3 and the ventilating ducts 5, 55 at the center and outer sides of each column of battery blocks 3 are blocked by that center blocking wall 19. Consequently, as shown in FIGS. 4 and 11, cooling gas for the battery blocks 3 in each column is supplied through separate supply ducts 6, 56, and cooling gas forced through the cooling gaps 4 is discharged through separate exhaust ducts 7, 57. In the battery systems of the figures, the battery cells 1 are cooled by cooling gas that is forced to flow through the supply ducts 6, 56 and exhaust ducts 7, 57 in opposite directions.

The battery systems described above have two parallel rows of battery blocks 3 in two separated columns for an overall two row by two column array. However, the battery system can also be made up of only two parallel rows of two battery blocks for a two row by one column arrangement. In this battery system, while cooling gas can be forced to flow through the supply ducts and exhaust ducts in opposite directions, it can also be forced to flow through the supply ducts and exhaust ducts in the same direction to cool the battery cells. Further, in a two row by two column array of four battery blocks, the center blocking wall between battery block columns and between ventilating ducts can be omitted to join the two battery blocks in each row in a straight-line and establish continuous ventilating ducts at the center and outer sides of each row. In this battery system, the ventilating duct at the center of the battery blocks arranged in two rows and two columns and the ventilating ducts at the outer sides can be used as either supply ducts or exhaust ducts. Cooling gas forcibly introduced from the supply duct(s) is passed through the cooling gaps and discharged from the exhaust duct(s). In this battery system as well, battery cells can be cooled by cooling gas forced to flow through the supply ducts and exhaust ducts in opposite directions or by cooling gas forced to flow through the supply ducts and exhaust ducts in the same direction.

The cross-sectional area of a ventilating duct 5 established between two parallel rows of battery blocks 3 is made twice the cross-sectional area of the ventilating ducts 5 established on the outer sides of those battery blocks 3. This is because cooling gas forcibly introduced to a supply duct 6 between two battery blocks 3 of the battery system shown in FIGS. 1-5 divides and flows to exhaust ducts 7 on both sides for discharge. Further, cooling gas forcibly introduced into two supply ducts 56 on both outer sides of the battery system shown in FIGS. 10-13 flows to the center exhaust duct 57 for discharge. Specifically, in the battery system shown in FIGS. 1-5, since the center supply duct 6 accommodates twice the flow accommodated by each outer side exhaust duct 7, the supply duct 6 cross-sectional area is made twice as large to reduce pressure losses. In the battery system of FIG. 5, the lateral width of the center supply duct 6 is made twice the width of each exhaust duct 7 to enlarge the cross-sectional area of the center ventilating duct 5. Similarly, in the battery system shown in FIGS. 10-13, since the center exhaust duct 57 accommodates twice the flow accommodated by each outer side supply duct 56, the exhaust duct 57 cross-sectional area is made twice as large to reduce pressure losses.

Figure 12:
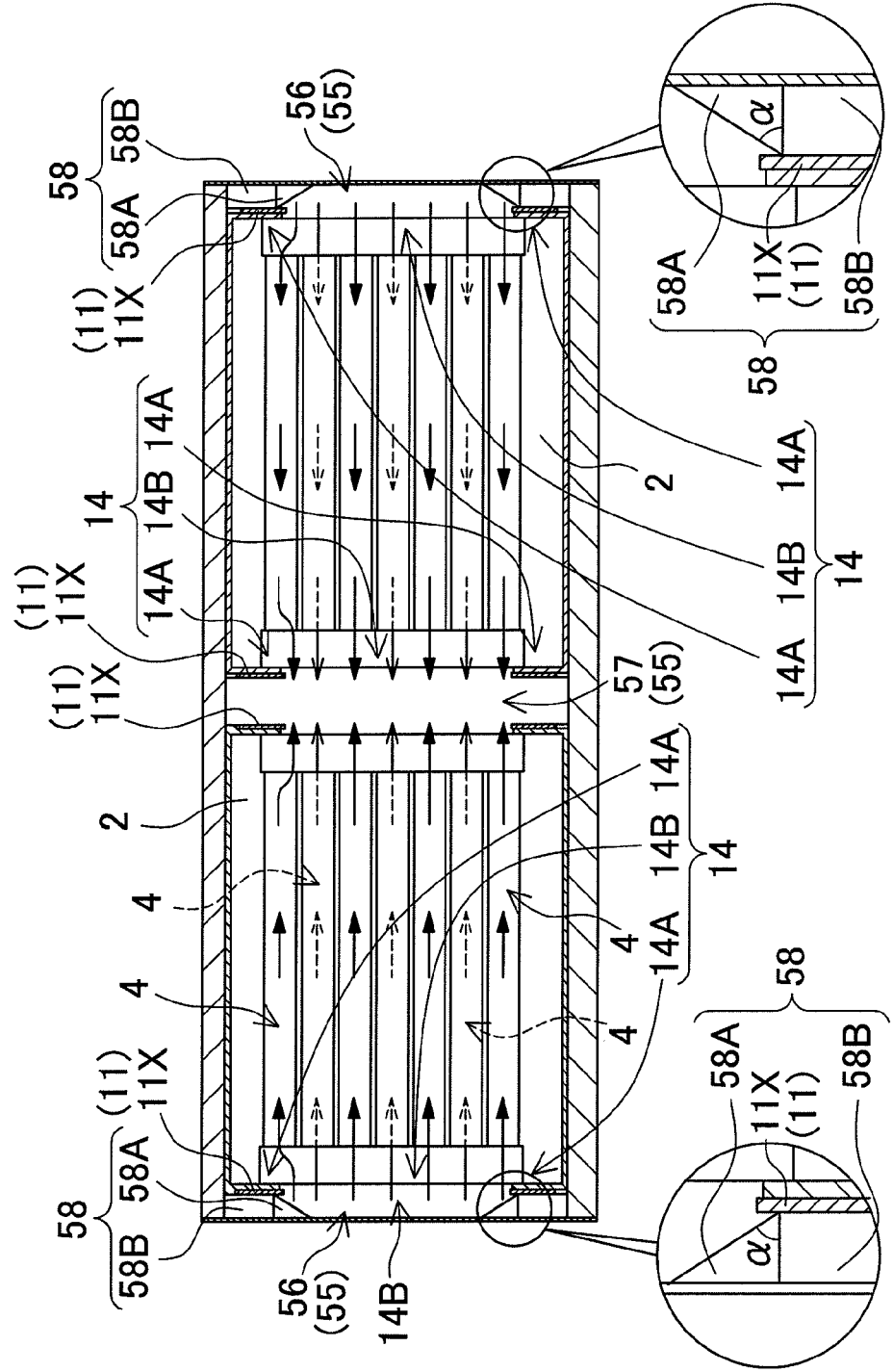
FIG. 12 is a cross-section through the line XII-XII of the battery system shown in FIG. 11 with enlarged insets.
Figure 13:
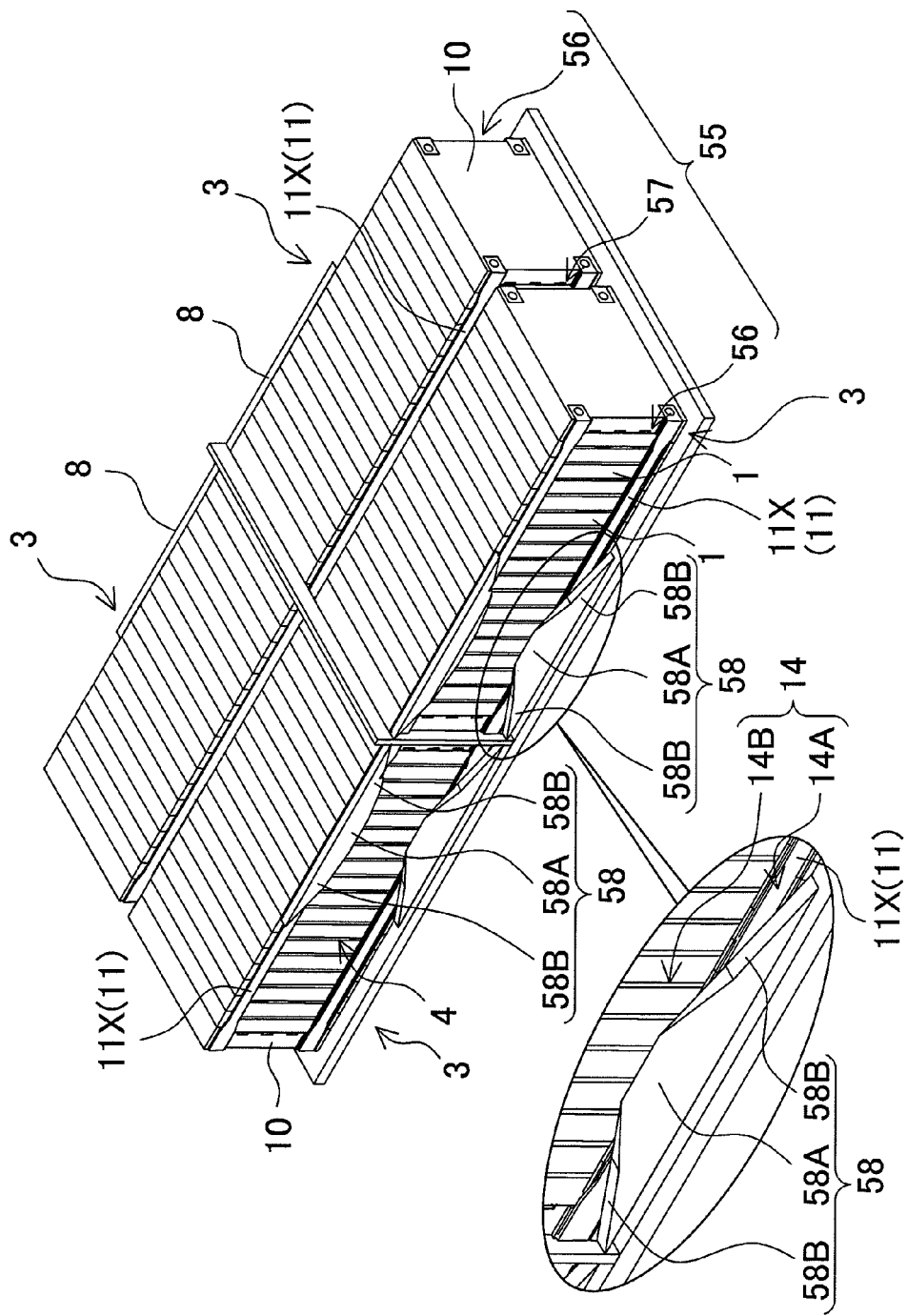
FIG. 13 is a diagrammatic perspective view with an enlarged inset showing the internal structure of the battery system shown in FIG. 10.
Figure 14:
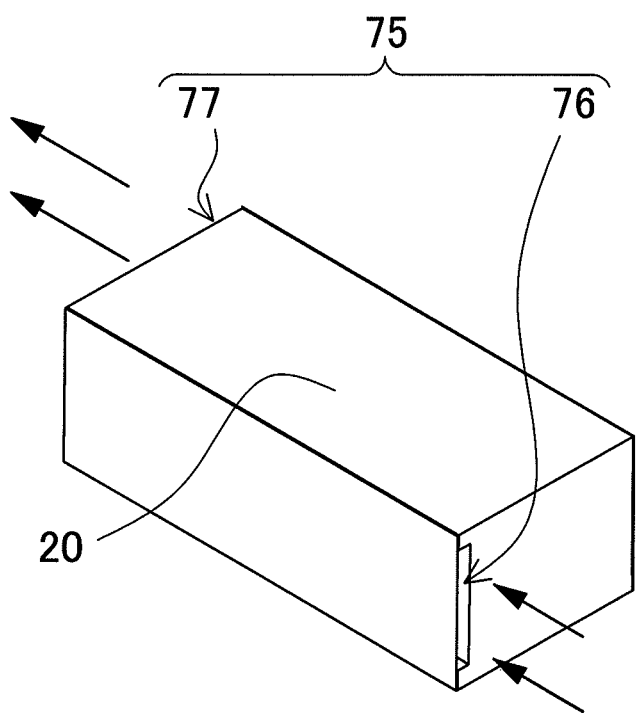
FIG. 14 is a diagrammatic perspective view of a battery system for another embodiment of the present invention.
Figure 15:
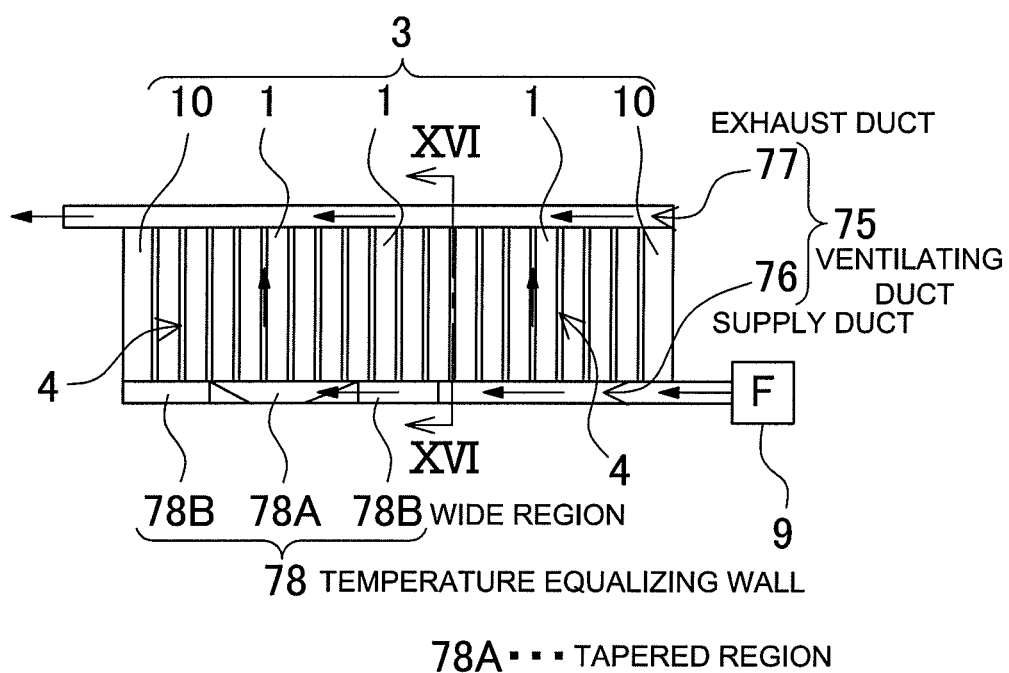
FIG. 15 is a diagrammatic horizontal cross-sectional view of the battery system shown in FIG. 14.

In the battery system of FIG. 12, the lateral width of the center exhaust duct 57 is made twice the width of each supply duct 56 to enlarge the cross-sectional area of the center ventilating duct 55.

The battery systems described above have battery blocks 3 arranged in two parallel rows, and ventilating ducts 5, 55 are established at the center and outer sides of the two rows of battery blocks 3. However, the battery system can also be configured with a single row of battery blocks. The battery system of FIGS. 14-17 has ventilating ducts 75 established on both sides of a single battery block 3 row. The ventilating duct 75 on one side is the supply duct 76, and the ventilating duct 75 on the other side is the exhaust duct 77. As shown by the arrows in FIGS. 14 and 15, cooling gas is forced to flow from the supply duct 76 to the exhaust duct 77 by the ventilating apparatus 9 to cool the battery cells 1 of this battery system.

Cooling gas forcibly introduced from the supply duct 76 flows through each cooling gap 4 to cool the battery cells 1. After cooling the battery cells 1, the cooling gas is collected in the exhaust duct 77 and discharged. Since the amount of cooling gas flow in the supply duct 76 and exhaust duct 76 is equal, the cross-sectional areas of the supply duct 76 and exhaust duct 77 on both sides of the battery block 3 are made equal. Specifically, the lateral width of the supply duct 76 is made equal to the lateral width of the exhaust duct 77.

Temperature equalizing walls 8, 58, 78 are disposed in supply ducts 6, 56, 76 to reduce temperature differences between battery cells 1. If the temperature difference between battery cells is reduced, remaining capacity becomes more uniform over all the battery cells, and the variation in charging and discharging efficiency is reduced. By equalizing the remaining capacity of each battery cell, microcomputer limitations on the amount of charging and discharging relax, and the amount of power transferred during charging and discharging increases compared to when there is remaining capacity variation between battery cells. Accordingly, the capability of each battery cell can be sufficiently exercised, and as a result, system performance can be adequately realized. Further, by reducing the temperature difference between battery cells stacked in the battery system, variation in charging and discharging efficiency is reduced to essentially equalize the degradation rate of all the battery cells. Consequently, since all battery cells reach their lifetime at essentially the same time, the capabilities of all the battery cells have been sufficiently utilized when the battery system reaches the end of its lifetime. Each temperature equalizing wall 8, 58, 78 has a long narrow shape that is longer in the direction of cooling gas flow than the width, and each temperature equalizing wall 8, 58, 78 gradually narrows towards the upstream end. The temperature equalizing walls 8, 58, 78 of FIGS. 7, 13, and 17 have downstream ends that gradually narrow and allow the smooth flow of cooling gas to reduce turbulence generation on the downstream side. Turbulence generation in a supply duct 6, 56, 76 is a cause of increased pressure loss. Consequently, temperature equalizing walls 8, 58, 78 that gradually narrow towards both the upstream and downstream ends can reduce pressure losses due to turbulence.

The temperature equalizing walls 8, 58, 78 of the figures have inclined slopes that narrow the vertical width of the walls as the upstream and downstream ends are approached. This gives the temperature equalizing walls 8, 58, 78 a centrally peaked truncated delta (Δ) shape. The battery system in FIGS. 7, 13, and 17 has temperature equalizing walls 8, 58, 78 disposed symmetrically at the top and bottom of the supply ducts 6, 56, 76. Consequently, a temperature equalizing wall 8, 58, 78 disposed at the bottom of a supply duct 6, 56, 76 is downward sloped towards the ends of the wall, and a temperature equalizing wall 8, 58, 78 disposed at the top of a supply duct 6, 56, 76 is upward sloped towards the ends of the wall. A configuration with temperature equalizing walls 8, 58, 78 disposed at the top and bottom of the supply ducts 6, 56, 76 can reduce battery cell 1 temperature differences with temperature equalizing walls 8, 58, 78 that are narrow in the vertical direction. This can reduce battery cell 1 temperature differences and even further reducing pressure losses. However, the battery system of the present invention does not necessarily require temperature equalizing walls at the top and bottom of the supply ducts in all cases. For example, although not illustrated, temperature equalizing walls can also be disposed only at the top, or only at the bottom of the supply ducts.

Figure 5:
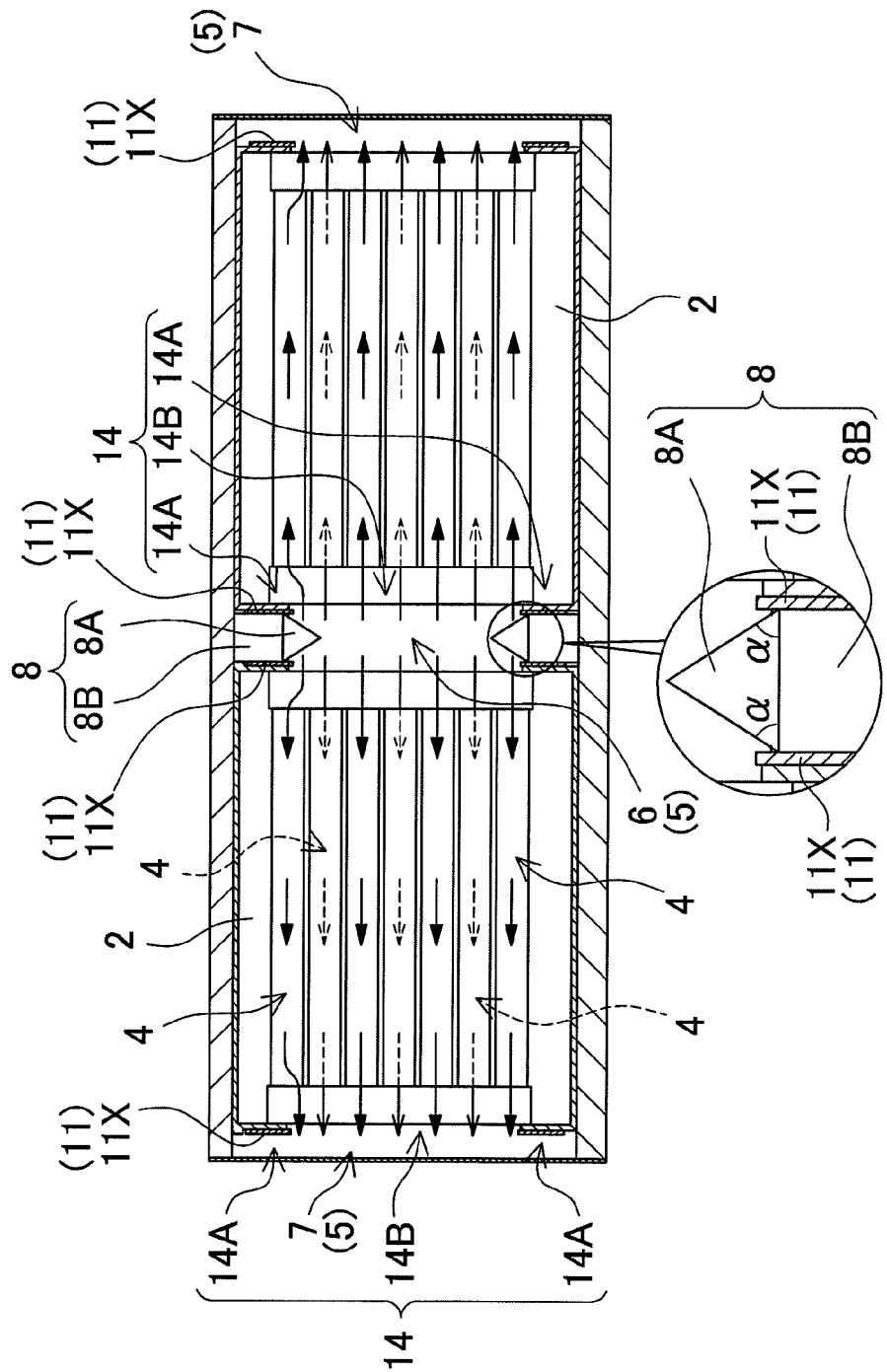
FIG. 5 is a cross-section through the line V-V of the battery system shown in FIG. 4 with an enlarged inset.
Figure 16:
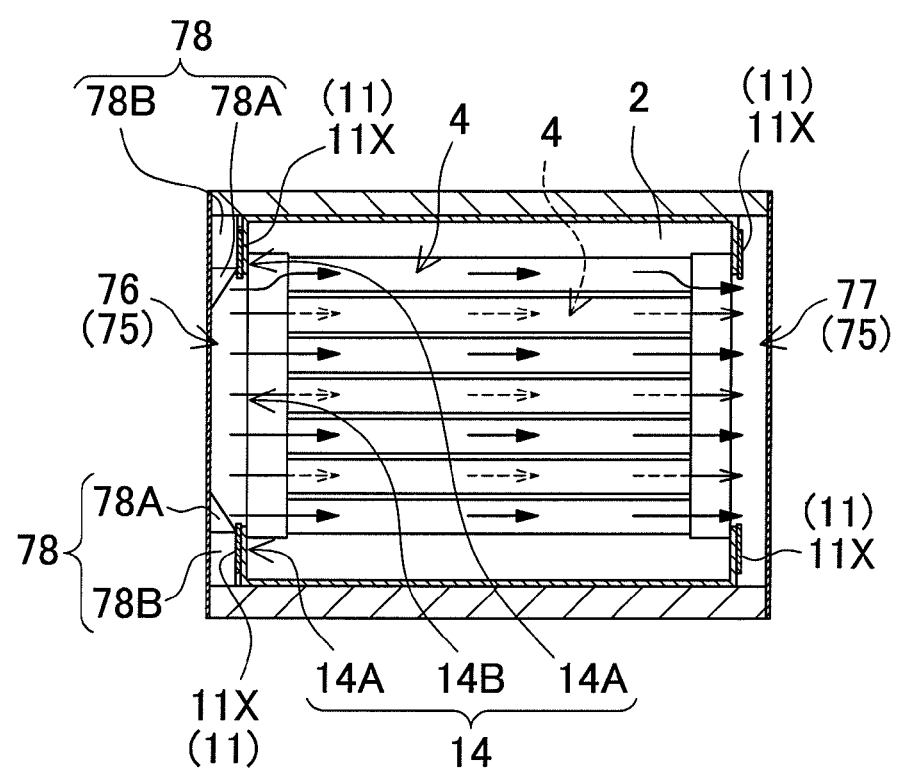
FIG. 16 is a cross-section through the line XVI-XVI of the battery system shown in FIG. 15.
Figure 17:
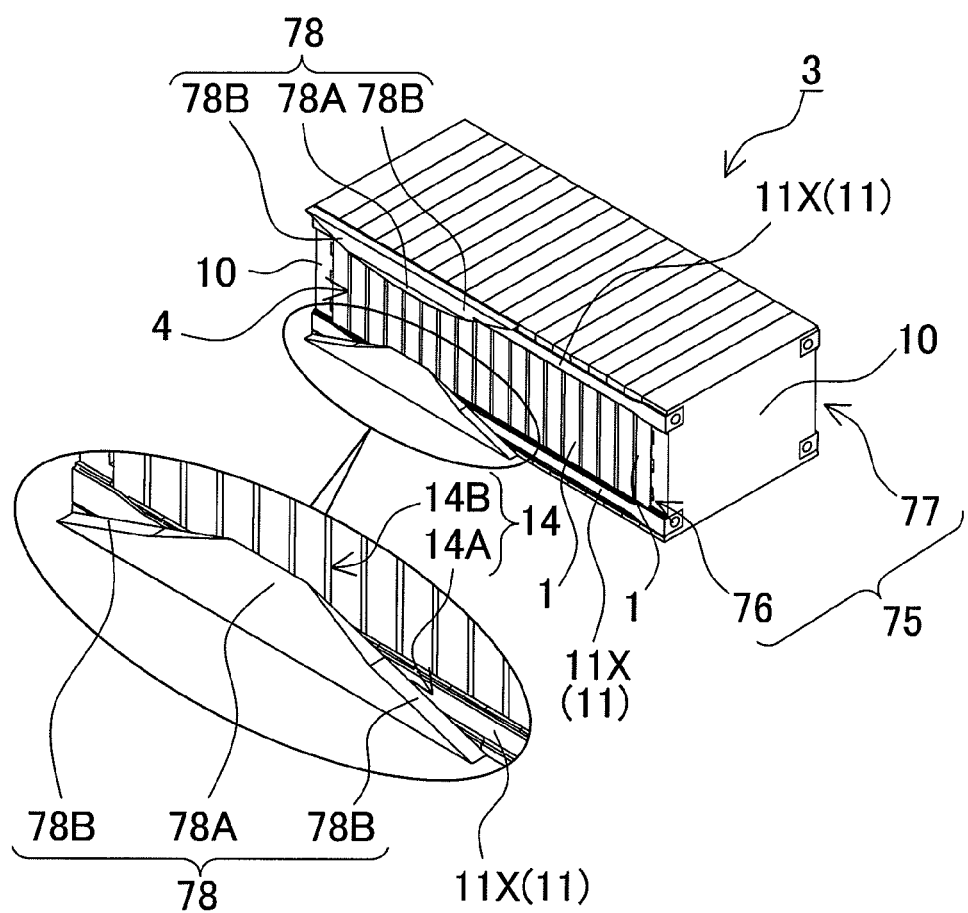
FIG. 17 is a diagrammatic perspective view with an enlarged inset showing the internal structure of the battery system shown in FIG. 14

The temperature equalizing walls 8, 58, 78 of FIGS. 5, 12, and 16 are provided with tapered regions 8A, 58A, 78A that become laterally narrower as the peak edge is approached, and the gap between each temperature equalizing wall 8, 58, 78 and the battery block 3 becomes gradually wider as the peak edge is approached. A temperature equalizing wall 8, 58, 78 tapered region 8A, 58A, 78A at the bottom of a supply duct 6, 56, 76 gradually becomes narrower in the upward direction to gradually widen the gap between the battery block 3 and the wall. A temperature equalizing wall 8, 58, 78 tapered region 8A, 58A, 78A at the top of a supply duct 6, 56, 76 gradually becomes narrower in the downward direction to gradually widen the gap between the battery block 3 and the wall. The temperature equalizing walls 8, 58, 78 of FIGS. 5, 7, 12, 13, 16, and 17 are not formed with an overall tapered shape, but rather are divided vertically into tapered regions 8A, 58A, 78A and wide regions 8B, 58B, 78B. For a temperature equalizing wall 8, 58, 78 at the bottom of a supply duct 6, 56, 76, the tapered region 8A, 58A, 78A is disposed above the wide region 8B, 58B, 78B. Conversely, for a temperature equalizing wall 8, 58, 78 at the top of a supply duct 6, 56, 76, the tapered region 8A, 58A, 78A is disposed below the wide region 8B, 58B, 78B. Each wide region 8B, 58B, 78B is shaped with a constant lateral width, or with a lateral width that changes vertically less than that of the tapered region 8A, 58A, 78A to establish sides that are close to vertical.

Figure 7:
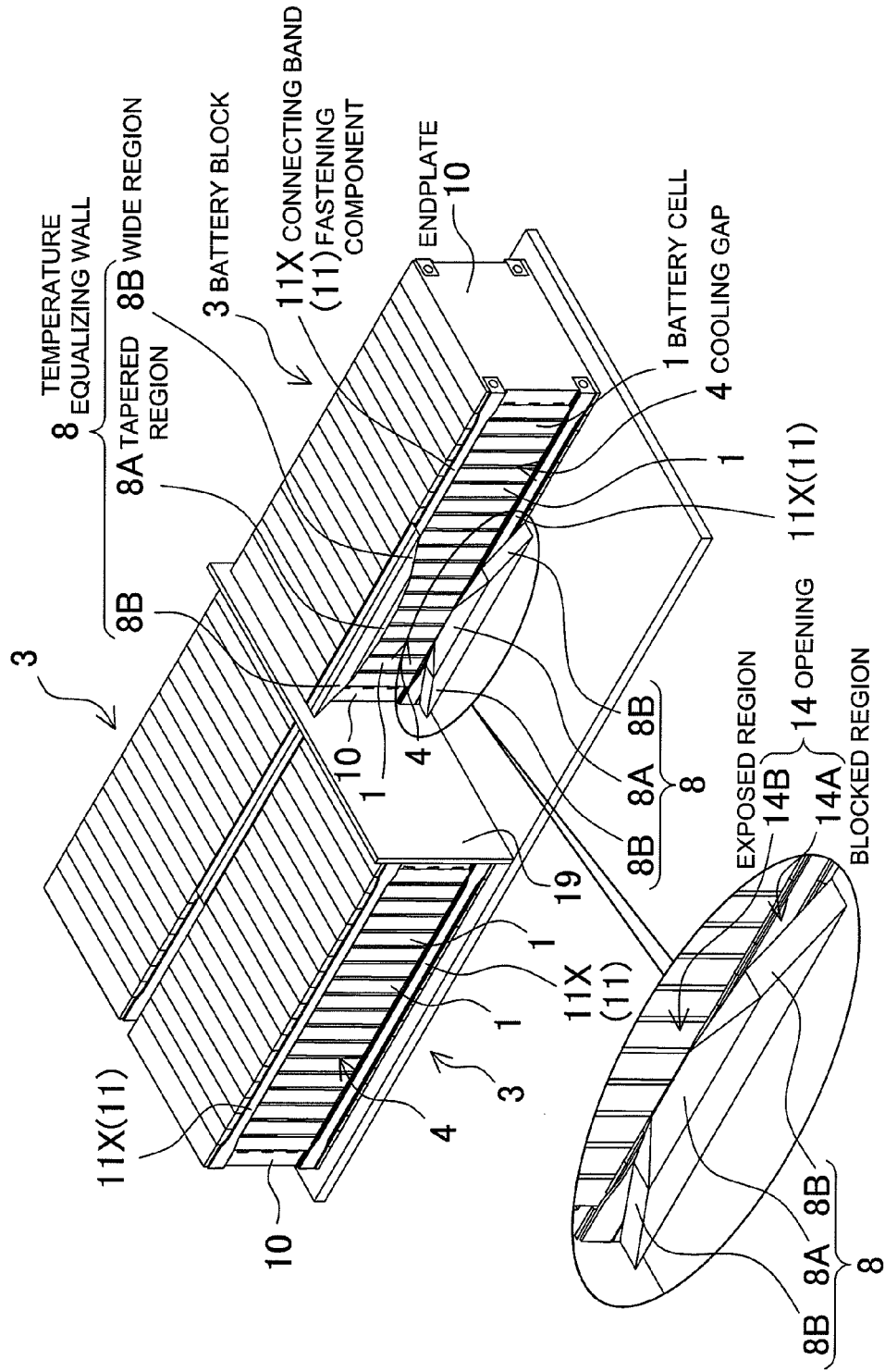
FIG. 7 is a diagrammatic perspective view with an enlarged inset showing the internal structure of the battery system shown in FIG. 3.

The battery system of FIGS. 5 and 7 has supply ducts 6 established between two rows of battery blocks 3 and has temperature equalizing walls 8 disposed in those supply ducts 6. A temperature equalizing wall 8 tapered region 8A has both sides tapered with the same slope ($\alpha$), and the gap between opposing battery block 3 surfaces is the same on both sides of the tapered surfaces. This serves to uniformly cool the battery cells 1 in battery blocks 3 on both sides of the tapered region 8A. In contrast, the battery system of FIGS. 12 and 13 has supply ducts 56 established on the outer sides of the two rows of battery blocks 3 and has temperature equalizing walls 58 disposed in those supply ducts 56. Here, a temperature equalizing wall 58 tapered region 58A has a tapered surface on the side facing the battery block 3 and a vertical surface on the outer side. Each temperature equalizing wall 58 disposed in supply ducts 56 on both outer sides of the two rows of battery blocks 3 has the same taper slope ($\alpha$) and the gap between battery blocks 3 and the tapered surfaces are symmetric on both sides of the battery blocks 3. This serves to uniformly cool the battery cells 1 in battery blocks 3 in both rows. Further, the battery system of FIGS. 16 and 17 has a supply duct 76 established on one side and an exhaust duct 77 established on the other side of a single battery block 3 row. Temperature equalizing walls 78 are disposed in the ventilating duct 75 on one side, which is the supply duct 76. Each temperature equalizing wall 78 tapered region 78A has a tapered surface on the side facing the battery block 3, which is the inner side, and a vertical surface on the outer side.

The angle of the taper slope ($\alpha$) of the tapered region 8A, 58A, 78A is set by the lateral width of the wide region 8B, 58B, 78B and the height of the tapered region 8A, 58A, 78A. The height of the tapered region is raised by increasing the taper angle ($\alpha$) and laterally widening the wide region. The height of the tapered region is lowered by reducing the taper angle ($\alpha$) and laterally narrowing the wide region.

For the temperature equalizing wall 8, 58, 78 tapered regions 8A, 58A, 78A described above, the height and length in the direction of flow of are set to minimize battery cell 1 temperature differences. In the battery systems shown in FIGS. 4, 11 and 15, the temperature of battery cells 1 disposed downstream in the cooling gas flow becomes higher than the temperature of battery cells 1 disposed upstream. To lower the temperature of the downstream battery cells 1 and reduce battery cell 1 temperature differences in the battery systems shown in FIGS. 4, 11 and 15, temperature equalizing walls 8, 58, 78 are disposed in the downstream end of the supply ducts 6, 56, 76. The height of the tapered regions 8A, 58A, 78A and length of the temperature equalizing walls 8, 58, 78 in the direction of flow are set to further reduce temperature differences of the battery cells 1 disposed in the downstream half of the battery block 3. Accordingly, battery system battery cells that become the hottest can be lowered in temperature, the rate of battery cell degradation can be reduced, and battery performance capability can be adequately extracted. Further, by lowering the temperature and extending the lifetime of the battery with the highest probability of reaching its lifetime first, other batteries can be used to their maximum capability, and the lifetime of the system can be extended. Specifically, battery system lifetime is extended because degradation of one specific battery does not cause the battery system to become nonfunctional.

In a battery system with no temperature equalizing walls, temperature differences develop between the nine battery cells in the upstream half of a battery block and the nine battery cells in the downstream half of the battery block. In particular, the temperature of the nine downstream battery cells becomes high and their temperature differences also become large. The battery cells 1 at the extreme upstream and downstream ends of a supply duct 6, 56, 76 are cooled by the endplates 10 and their temperature remains low. Since cooling gas that has passed through the upstream side of a supply duct is introduced to the downstream side, battery cells disposed in the downstream side become highest in temperature. Of the nine battery cells in the downstream side (in a battery block with eighteen battery cells), the temperature of the downstream side center, fourteenth battery cell becomes highest in temperature. Battery cells disposed upstream and downstream of that downstream side center battery cell become gradually lower in temperature with distance from the center battery cell. For example, when the temperature of the battery cell at the center of the downstream side rises to 34° C., the temperature of the battery cells at both ends of the downstream half of the battery block, namely the tenth and eighteenth battery cells, becomes 30° C. or lower. Here, the temperature of the coolest battery cell at the upstream half of the battery block becomes approximately 23° C.

To efficiently cool battery cells 1 disposed in the downstream side of a supply duct 6, 56, 76 of the battery system of the figures, temperature equalizing walls 8, 58, 78 are disposed in the downstream side of the supply duct 6, 56, 76. These temperature equalizing walls 8, 58, 78 reduce the temperature of each battery cell 1 disposed in the downstream side and also reduce temperature differences between battery cells 1. To accomplish this, temperature equalizing wall 8, 58, 78 length in the direction of flow and height of the tapered regions 8A, 58A, 78A are set to specific dimensions. The temperature equalizing walls 8, 58, 78 disposed in a supply duct 6, 56, 76 cause cooling gas to efficiently flow into the cooling gaps 4 to ventilate the high temperature battery cells 1 and lower the temperature of those battery cells 1.

In the battery systems of FIGS. 7, 12, 13, 16, and 17, the wide regions 8B, 58B, 78B of the temperature equalizing walls 8, 58, 78 are disposed opposite battery block 3 connecting bands 11X, and the tapered regions 8A, 58A, 78A are disposed opposite battery block 3 exposed regions 14B. Specifically, the wide regions 8B, 58B, 78B are disposed outside the blocked regions 14A of the cooling gaps 4, and the tapered regions 8A, 58A, 78A are disposed outside the exposed regions 14B of the cooling gaps 4. For example, in the battery system of FIG. 5, the temperature equalizing wall 8 wide regions 8B are disposed between the connecting bands 11X of the two rows of battery blocks 3, and the tapered regions 8A are disposed between the exposed regions 14B of the two rows of battery blocks 3.

Here, since the openings 14 of the cooling gaps 4 are blocked by the connecting bands 11X in the blocked regions 14A, even if cooling gas flows outside a blocked region 14A, no cooling gas enters the cooling gaps 4 in that region. In the battery systems shown in the cross-sections of FIGS. 5, 11, and 16, the temperature equalizing wall 8, 58, 78 wide regions 8B, 58B, 78B in the downstream sides of the supply ducts 6, 56, 76 are disposed in close proximity to the fastening component 11 connecting bands 11X, or are disposed with no gaps between the wide regions 8B, 58B, 78B and the connecting bands 11X. In a battery system of this configuration, no cooling gas flows next to the blocked regions 14A closed off by battery block 3 connecting bands 11X in the downstream side where temperature equalizing walls 8, 58, 78 are disposed. Therefore, all of the forced ventilation cooling gas is delivered to battery block 3 exposed regions 14B to smoothly flow into the cooling gaps 4 in the exposed regions 14 and efficiently cool the battery cells 1.

The tapered regions 8A, 58A, 78A of the temperature equalizing walls 8, 58, 78 protrude over the exposed regions 14B, and become vertically wider opposite the exposed regions 14B where battery cell 1 temperature becomes high. Therefore, cooling gas forcibly introduced into a supply duct 6, 56, 76 flows between the tapered regions 8A, 58A, 78A and the exposed regions 14B. Cooling gas flow rate increases due to the tapered regions 8A, 58A, 78A, and the tapered regions 8A, 58A, 78A facilitate smooth entry of the cooling gas into the cooling gaps 4 for efficient battery cell 1 cooling. Since the vertically widest parts of the tapered regions 8A, 58A, 78A are disposed where the battery cells 1 rise to the highest temperatures, the high temperature battery cells are cooled more efficiently than other battery cells and battery temperature is lowered. Consequently, the cooling efficiency of the high temperature battery cells can be set by the vertical width (height) of the tapered regions 8A, 58A, 78A, and the battery cells that are made lower in temperature are determined by the length of the tapered regions 8A, 58A, 78A in the flow direction. In the battery systems of FIGS. 4-7, 11-13, and 15-17, temperature equalizing walls 8, 58, 78 are disposed in the downstream side of the supply ducts 6, 56, 76 to cool the downstream battery cells more efficiently. Further, the tapered regions 8A, 58A, 78A are made higher in the high temperature battery cell region of the downstream side of a supply duct 6, 56, 76. Consequently, the number of battery cells cooled by the temperature equalizing walls 8, 58, 78 can be controlled by the length of the walls in the direction of flow, and the cooling efficiency of the battery cells that become highest in temperature can be set by the vertical width. Therefore, the temperature equalizing walls 8, 58, 78 are disposed in the regions where battery cells reach high temperatures in the absence of any temperature equalizing walls 8, 58, 78. Further, the height of the tapered regions 8A, 58A, 78A is set to reduce the maximum temperature of the battery cells that become the hottest and minimize temperature differences in the battery system.

Figure 1:
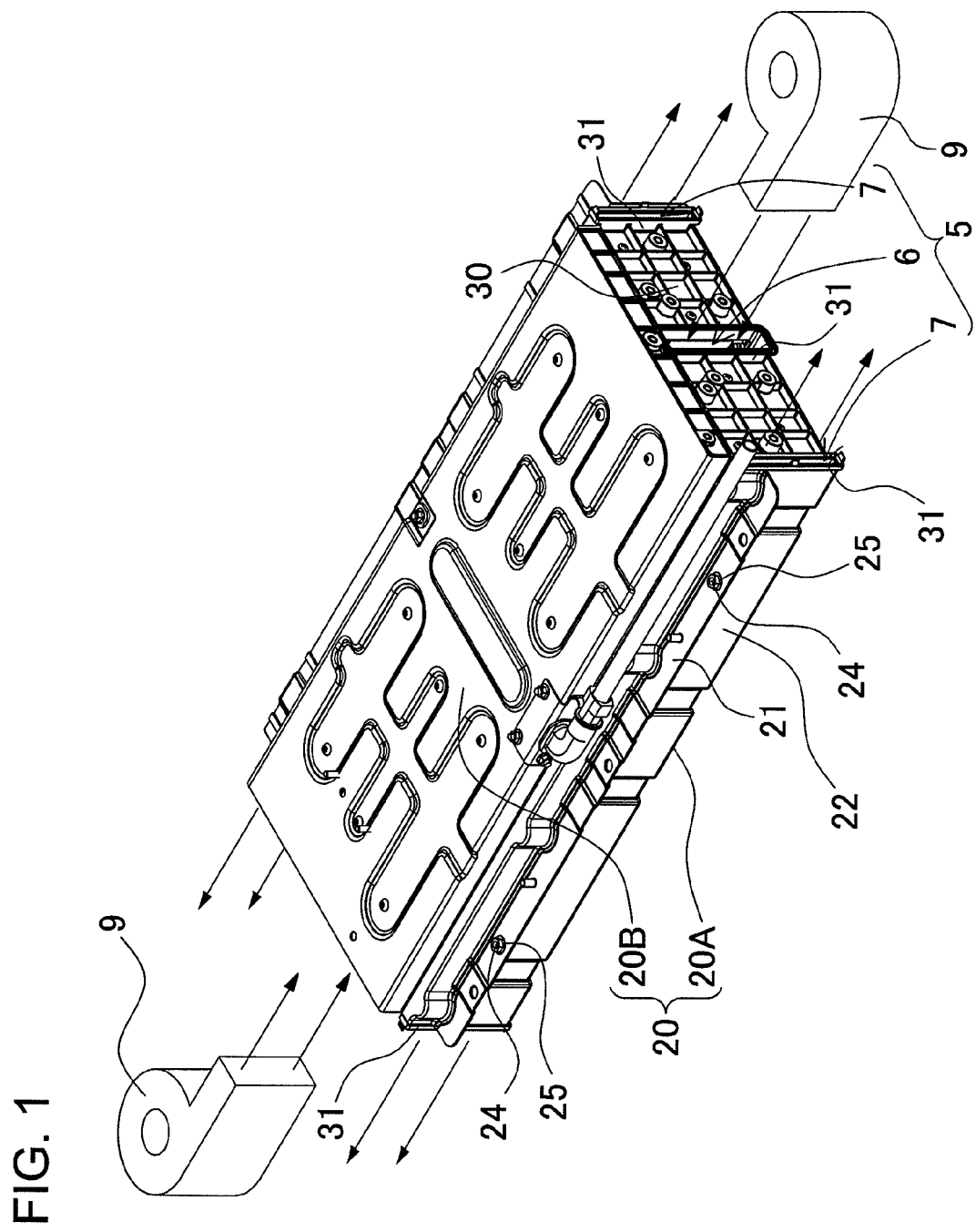
FIG. 1 is a perspective view of a battery system for an embodiment of the present invention.
Figure 2:
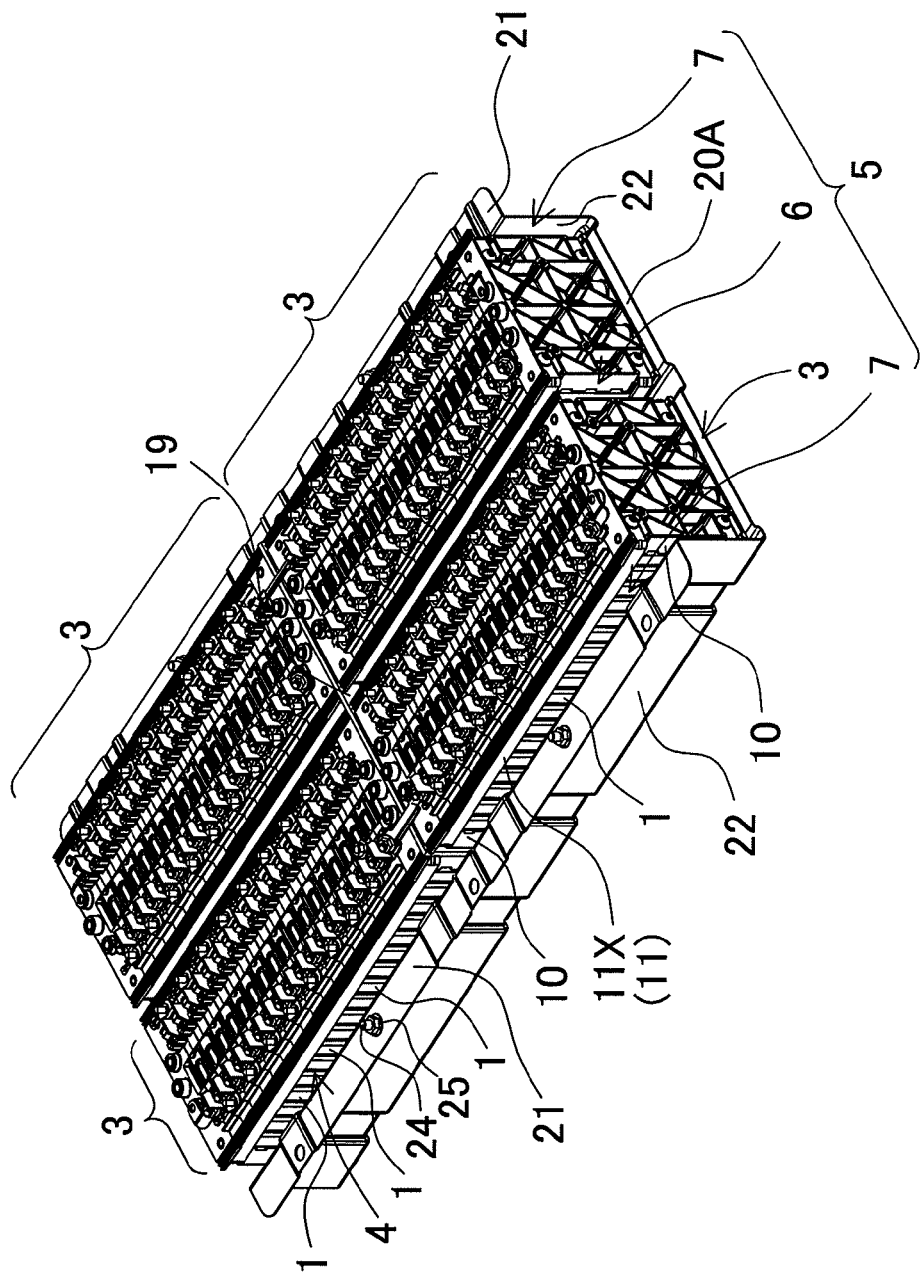
FIG. 2 is a perspective view showing the internal structure of the battery system shown in FIG. 1.
Figure 3:
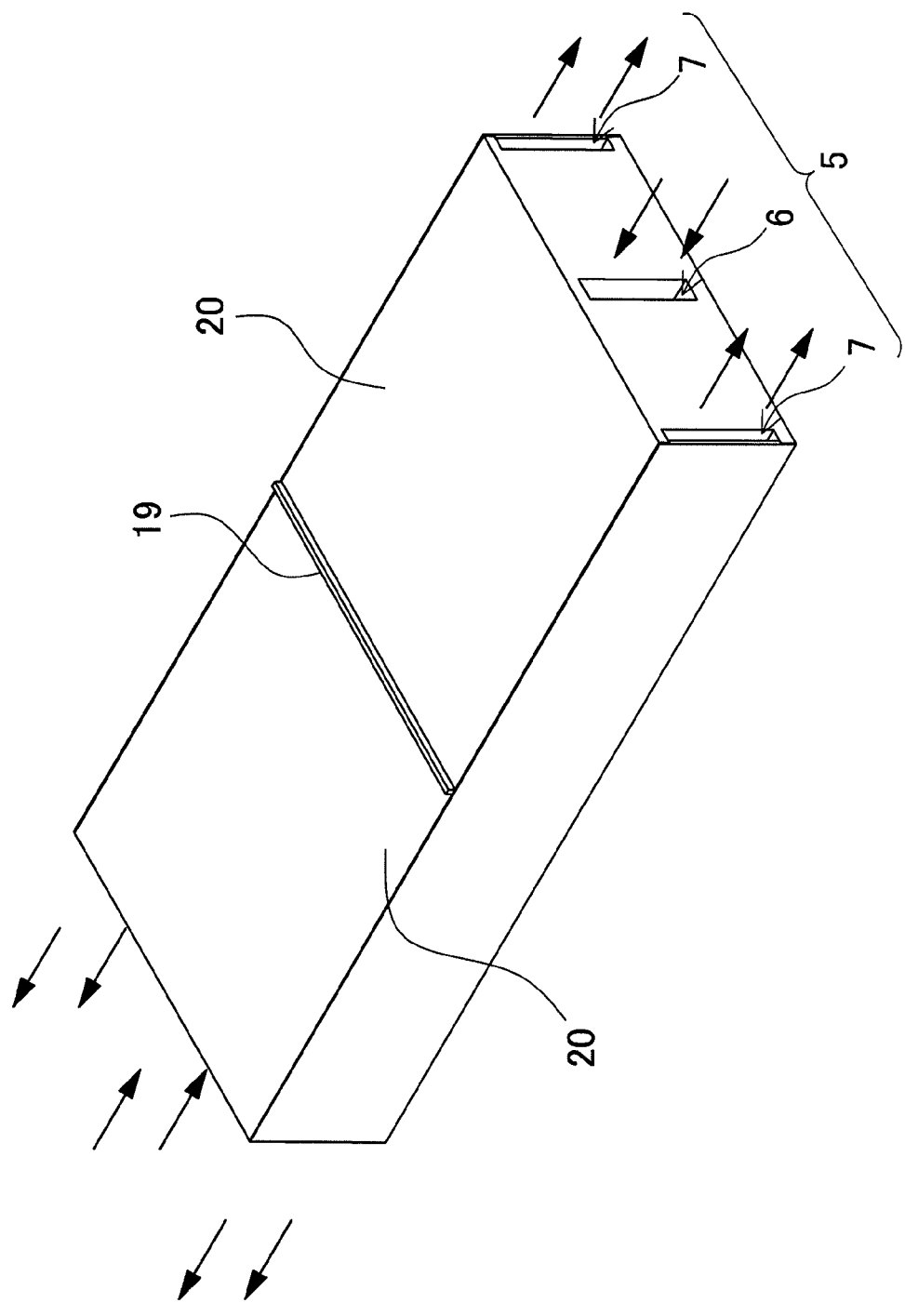
FIG. 3 is a diagrammatic perspective view of a battery system for an embodiment of the present invention.

The battery blocks 3 of each battery system described above are mounted in an external case 20 and disposed in fixed positions. The external case 20 of the battery system shown in FIGS. 1 and 2 is made up of an upper case 20B and a lower case 20A. The upper case 20B and the lower case 20A have flanges 21 that project outward, and these flanges 21 are joined by nuts 25 and bolts 24. The external case 20 of the figures has flanges 21 disposed outside the side surfaces of the battery blocks 3. However, the flanges can also be disposed at the top, bottom, or intermediate location with respect to the battery blocks. The battery blocks 3 are attached to the external case 20 by attaching the endplates 10 to the lower case 20A with set screws (not illustrated). Set screws are passed through holes in the lower case 20A and screwed into screwholes (not illustrated) in the endplates 10 to attach the battery blocks 3 to the external case 20. The heads of the set screws protrude from the bottom of the lower case 20A. Further, in the external case 20 of FIGS. 1 and 2, the battery blocks 3 are mounted inside, and ventilating ducts 5 are established between the outer sides of the battery blocks 3 and the inside surfaces of the external case 20 side-walls 22. In addition, the external case 20 has end-plane walls 30 attached at both ends. The end-plane walls 30 are joined to the battery blocks 3 and provided with connecting ducts 31 that are formed as a single piece with the end-plane walls 30 from a material such as plastic and connect to the ventilating ducts 5, which are the supply ducts 6 and exhaust ducts 7. These connecting ducts 31 connect to the ventilating apparatus 9 and to external discharge ducts (not illustrated) that discharge the cooling gas from the battery system. Although not illustrated, these endplane walls 30 connect to battery block endplates by an interlocking structure. However, the end-plane walls can also connect to the battery blocks by a configuration other than an interlocking structure, or they can also be attached to the external case.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2009-114,011 filed in Japan on May 8, 2009, the content of which is incorporated herein by reference.

What is claimed is:

1. A battery system comprising:
   battery blocks having a plurality of battery cells, which are rectangular batteries, stacked with intervening cooling gaps established to permit cooling gas to pass between the battery cells;
   ventilating ducts, which are supply ducts and exhaust ducts, disposed on both sides of the battery blocks to force ventilation through the cooling gaps and cool the battery cells; and
   ventilating apparatus to force cooling gas into the supply ducts,
   wherein cooling gas forcibly introduced by the ventilating apparatus flows from the supply ducts through the cooling gaps and into the exhaust ducts to cool the battery cells,
   wherein temperature equalizing walls are disposed in the supply ducts, and each of the temperature equalizing walls has a long narrow shape with a width and a length in a direction of flow that is greater than the width, and an upstream end of each temperature equalizing wall becomes gradually narrower towards the upstream end, and
   wherein each of the temperature equalizing walls is provided with a tapered region with a lateral width that narrows with increasing distance from each of opposing surfaces of the supply ducts.

2. The battery system as cited in claim 1 wherein each temperature equalizing wall is provided with a tapered region at the center of a wide region; and the wide region has constant lateral width or has lateral width that changes little compared to the tapered region, and has side walls that are vertical or close to vertical.

3. The battery system as cited in claim 1, wherein the temperature equalizing wall tapered region taper angle (α) is the same on both sides of the temperature equalizing wall.

4. The battery system as cited in claim 1,
wherein the temperature equalizing walls are disposed in opposing positions at ends of each of the supply ducts in a vertical direction, which is orthogonal to a stacked direction of the battery cells.

5. The battery system as cited in claim 4, wherein the temperature equalizing walls are disposed in each of the supply ducts so as to be separated from each other in the vertical direction, and
wherein each of the temperature equalizing walls is configured to be elongated in the stacked direction of the battery cells so as to cover part of sides of the battery cells in the vertical direction.

6. The battery system as cited in claim 4, wherein a downstream end of each temperature equalizing wall becomes gradually narrower towards the downstream end.

7. The battery system as cited in claim 4, wherein the upstream end of each temperature equalizing wall is inclined to narrow a vertical width towards the upstream end.

8. The battery system as cited in claim 4, wherein a downstream end of each temperature equalizing wall is inclined to narrow a vertical width towards the downstream end.

9. The battery system as cited in claim 4, wherein the upstream end of each temperature equalizing wall is inclined to narrow a vertical width towards the upstream end, and a downstream end of each temperature equalizing wall is inclined to narrow the vertical width towards the downstream end.

10. The battery system as cited in claim 9, wherein each temperature equalizing wall has a shape that is inclined on both sides to narrow the vertical width towards the upstream and downstream ends, and has an overall centrally elevated hill shape.

11. The battery system as cited in claim 4, wherein the temperature equalizing walls are disposed in a downstream side of the supply duct.

12. The battery system as cited in claim 4, wherein the battery blocks are disposed in two rows, the supply ducts are established between adjacent battery blocks, and the temperature equalizing walls are disposed in the supply ducts.

13. The battery system as cited in claim 4 wherein the battery blocks are disposed in two rows, the supply ducts are established between adjacent battery blocks, and the temperature equalizing walls are disposed in opposing positions along two opposing surfaces of the supply ducts.

14. The battery system as cited in claim 4, wherein the battery blocks are disposed in two rows, the supply ducts are established between adjacent battery blocks, and each of the temperature equalizing walls is disposed along an opposing surface of the respective supply duct.

15. The battery system as cited in claim 4, wherein the battery blocks are disposed in two rows, the supply ducts are established between adjacent battery blocks, and the temperature equalizing walls are formed as symmetrical figures and are disposed at diametrically opposed positions inside each of the supply ducts.

16. A battery system comprising:
battery blocks having a plurality of battery cells, which are rectangular batteries, stacked with intervening cooling gaps permit cooling gas to pass between the battery cells;
ventilating ducts, which are supply ducts and exhaust ducts, disposed on both sides of the battery blocks to force ventilation through the cooling gaps and cool the battery cells; and
ventilating apparatus to force cooling gas into the supply ducts,
wherein cooling gas forcibly introduced by the ventilating apparatus flows from the supply ducts through the cooling gaps and into the exhaust ducts to cool the battery cells,
wherein temperature equalizing walls are disposed in the supply ducts, and each of the temperature equalizing walls has a long narrow shape with a width and a length in the direction of flow that is greater than the width, and an upstream end of each temperature equalizing wall becomes gradually narrower towards the upstream end,
wherein each of the battery blocks is provided with a pair of endplates disposed at ends of the stack of battery cells, and fastening components that connect the pair of endplates,
wherein the fastening components are connecting bands having a width, and the connecting bands are disposed at opposite ends of the battery block in a vertical direction, which is orthogonal to a stacked direction of the battery cells;
wherein openings to the cooling gaps on both sides of the battery cells are locally blocked by the connecting bands of the fastening components, and the cooling gap openings are divided into blocked regions which correspond to a position of the connecting bands and exposed regions between the blocked regions that connect with the ventilating ducts;
wherein the temperature equalizing walls are disposed in the supply ducts outside the blocked regions and the exposed regions; and
wherein each temperature equalizing wall is provided with a wide region disposed in close proximity to connecting bands, and a tapered region disposed outside the exposed region that forms gaps between sides of the battery cells that widens with increasing distance from each of opposing surfaces of the supply ducts.

17. The battery system as cited in claim 16, wherein the temperature equalizing wall wide region is disposed next to one of the connecting bands without forming any gap in between, or is disposed in close proximity to the connecting band.

18. The battery system as cited in claim 16, wherein the battery blocks are disposed in two rows, the supply ducts are established between adjacent battery blocks, the temperature equalizing walls are disposed in opposing positions along two opposing surfaces of the respective supply ducts, the wide regions of the temperature equalizing walls are disposed between the connecting bands of the battery blocks in the two rows, and the tapered regions are disposed between the exposed regions.

19. The battery system as cited in claim 18, wherein each of the temperature equalizing walls is disposed in opposing positions along two opposing surfaces of the respective supply duct, the wide regions of the temperature equalizing walls are disposed between the connecting bands of the battery blocks in the two rows, and the tapered regions are disposed between the exposed regions and the width of the tapered regions become gradually narrower with increasing distance from opposing surfaces of the supply ducts.

* * * * *